United States Patent
Bliesner et al.

(10) Patent No.: US 11,698,814 B2
(45) Date of Patent: Jul. 11, 2023

(54) CLOUD RESOURCES MANAGEMENT

(71) Applicant: Vega Cloud, Inc., Liberty Lake, WA (US)

(72) Inventors: Kris Bliesner, Liberty Lake, WA (US); Kelly Sale, Priest River, ID (US); Michael Brown, Liberty Lake, WA (US); Shawn Branstetter, Hayden, ID (US)

(73) Assignee: Vega Cloud, Inc., Liberty Lake, WA (US)

( * ) Notice: Subject to any disclaimer, the term of this patent is extended or adjusted under 35 U.S.C. 154(b) by 192 days.

(21) Appl. No.: 17/004,781

(22) Filed: Aug. 27, 2020

(65) Prior Publication Data

US 2021/0073034 A1     Mar. 11, 2021

Related U.S. Application Data

(60) Provisional application No. 62/892,955, filed on Aug. 28, 2019.

(51) Int. Cl.
*G06F 9/50* (2006.01)
*G06F 9/451* (2018.01)
*G06Q 30/0601* (2023.01)

(52) U.S. Cl.
CPC ............ *G06F 9/5011* (2013.01); *G06F 9/451* (2018.02); *G06Q 30/0641* (2013.01); *G06F 9/505* (2013.01); *G06F 9/5027* (2013.01); *G06F 9/5038* (2013.01); *G06F 9/5044* (2013.01)

(58) Field of Classification Search
CPC ...... G06F 9/5027; G06F 9/5011; G06F 9/451; G06Q 30/0641
See application file for complete search history.

(56) References Cited

U.S. PATENT DOCUMENTS

| | | | | |
|---|---|---|---|---|
| 2011/0055712 A1* | 3/2011 | Tung | ..................... | H04L 43/045 715/741 |
| 2014/0165060 A1* | 6/2014 | Muller | ................ | G06F 9/45558 718/1 |
| 2015/0347183 A1* | 12/2015 | Borthakur | ............. | G06F 9/5088 718/105 |
| 2016/0062780 A1* | 3/2016 | Young | ................. | G06F 9/45558 718/1 |
| 2019/0087213 A1* | 3/2019 | Matters | ............... | G06F 9/45558 |
| 2020/0209946 A1* | 7/2020 | Visconti | ............. | G06F 9/45558 |
| 2020/0241911 A1* | 7/2020 | Honnavalli | ......... | G06F 11/1446 |

* cited by examiner

*Primary Examiner* — Daniel Samwel
(74) *Attorney, Agent, or Firm* — Chang & Hale LLP

(57) ABSTRACT

Techniques discussed herein relate to managing service provider resources. The techniques may include receiving a first request to organize a first workload and a second workload into a space. The first workload may be associated with a first computing resource of a first service provider and the second workload may be associated with a second computing resource of a second service provider. The techniques may import data associated with the first workload and the second workload into the space. The techniques may cause an action to be performed for the first workload and the second workload by implementing a first workflow for the first workload and implementing a second workflow for the second workload.

18 Claims, 27 Drawing Sheets

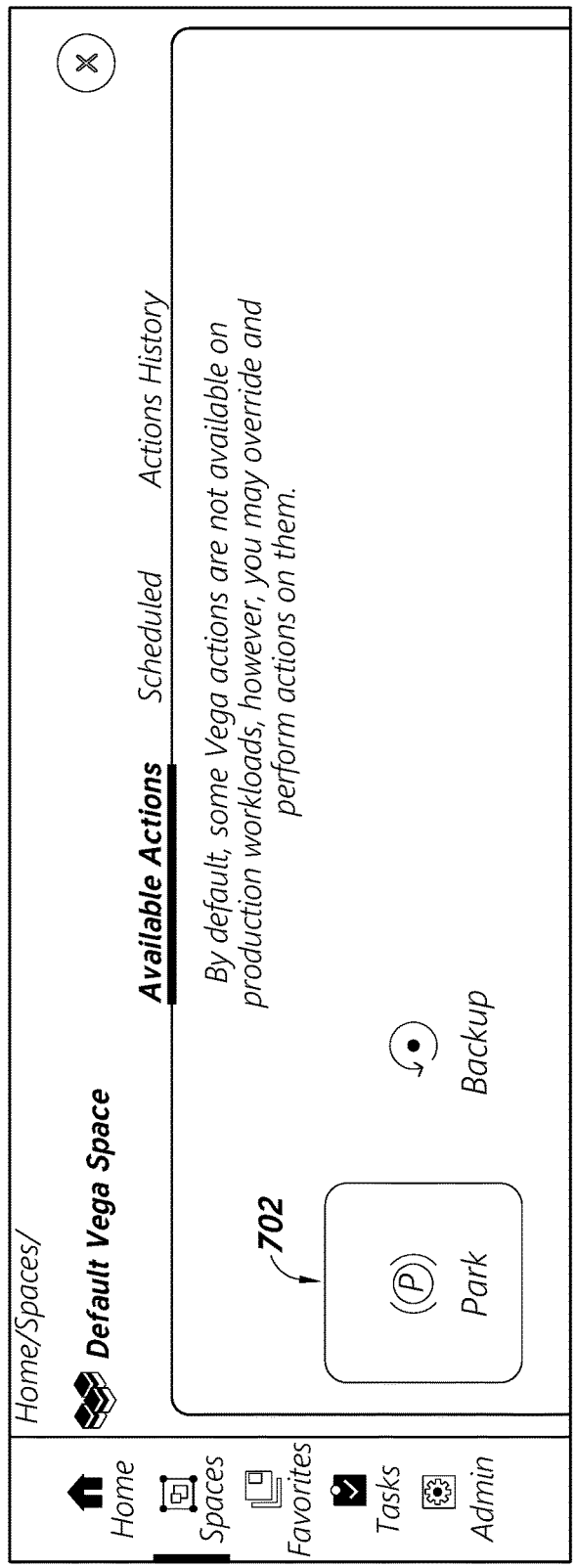

FIG. 12

Home/Spaces/Default Vega Space

← RC Master Account                        👤 Shawn Branstetter ▼

Overview Resources    Resource Pools/Workloads

| Type | | | | Updated: 2 hours ago [Refresh List] | |
|---|---|---|---|---|---|
| Resources | 20 | | | | |
| Security Accesses | | | | | |
| Id | Name | Status | Region | Zone | Cloud Provider |
| sg-681e0c18 | default | | ap-northeast-1 | ... | AWS |
| sg-24a5a445 | default | | ap-northeast-2 | ... | AWS |
| sg-45eaed28 | default | | eu-west-3 | ... | AWS |
| sg-8f4bb2ee | default | | eu-west-2 | ... | AWS |
| sg-4607c527 | default | | ap-south-1 | ... | AWS |
| sg-1ac20352 | default | | eu-west-1 | ... | AWS |
| sg-07a4ba68 | default | | ca-central-1 | ... | AWS |
| sg-95f554c0 | default | | us-east-1 | ... | AWS |
| sg-835800e8 | default | | eu-north-1 | ... | AWS |
| sg-76ff4b13 | default | | us-east-2 | ... | AWS |
| sg-ee469290 | default | | ap-southeast-1 | ... | AWS |
| sg-9125c1e0 | default | | ap-southeast-2 | ... | AWS |
| sg-feb7689b | default | | eu-central-1 | ... | AWS |

Resource Pool  aws
0025 2678 2239

$16.66
Montly Total Cost $0.00
Montly Budget ↑ $16.66

Compute: $0.00
0% of total cost

Database: $0.00
0% of total cost

Storage: $0.00
0% of total cost

Network: $1.00
6% of total cost

Other Services: $15.66
93% of total cost

1200

CLOUD RESOURCES MANAGEMENT

CROSS-REFERENCE TO RELATED APPLICATIONS

This application claims priority to U.S. Provisional Application No. 62/892,955, filed Aug. 28, 2019 and entitled "Centralized Cloud Computing," the entire contents of which are incorporated herein by reference.

BACKGROUND

Service providers operate networks and provide network-based and/or cloud-based services. Cloud-based services implement various types of scalable or on-demand services, such as storage services, compute services, database services, network services, and so forth. As part of this process, service providers offer users the ability to purchase and utilize computing resources such as virtual machine (VM) instances, data storage resources, database resources, networking resources and/or services. With the proliferation of cloud-based services, managing, organizing, and optimizing computing resources has become an increasing problem. For example, the use of computing resources is highly elastic and dynamic, making it difficult to plan, forecast, and provision computing resources. In such instances, over-provisioning computing resources may lead to unnecessary costs. Additionally, managing computing resources is often an isolated and segmented process, requiring that computing resources be individually managed. For example, in instances where computing resources are provisioned across multiple datacenters, users may have to individually perform an action on the computing resource(s) in each datacenter. This problem becomes exacerbated when users utilize computing resources across different service provider networks.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5-1 illustrates an example user interface to facilitate creation of a new space in accordance with one or more embodiments.

FIG. 5-2 illustrates an example user interface to provide information to create a space in accordance with one or more embodiments.

FIG. 5-3 illustrates an example user interface to provide a list of spaces associated with a user account in accordance with one or more embodiments.

FIG. 6-1 illustrates an example user interface may present information to create a workload and/or associate the workload with a space in accordance with one or more embodiments.

FIG. 6-2 illustrates an example user interface to enable creation/association of a workload with a space in accordance with one or more embodiments.

FIG. 6-3 illustrates an example user interface to provide information to create/import/request creation of a workload in accordance with one or more embodiments.

FIG. 7-1 illustrates an examples user interface to initiate an action for a space/workload in accordance with one or more embodiments.

FIG. 7-2 illustrates an example user interface to select a computing resource(s) for an action in accordance with one or more embodiments.

FIG. 7-3 illustrates an example user interface to provide summary information about an action in accordance with one or more embodiments.

FIG. 12 illustrates an example user interface to provide information about a workload in accordance with one or more embodiments.

FIG. 14-1 illustrates an example user interface to present a calendar representation to enable a user to view/designate/update a parking schedule for a space in accordance with one or more embodiments.

FIG. 14-2 illustrates an example user interface with an updated parking/running schedule for a space in accordance with one or more embodiments.

FIG. 14-3 illustrates an example user interface to indicate that a parking action is initiated in accordance with one or more embodiments.

FIG. 14-4 illustrates an example user interface to unpark a space in accordance with one or more embodiments.

FIG. 14-5 illustrates an example user interface to indicate that an unparking action is initiated in accordance with one or more embodiments.

FIG. 14-6 illustrates an example user interface to delete a schedule for a space in accordance with one or more embodiments.

FIG. 14-7 illustrates an example user interface to park a space immediately in accordance with one or more embodiments.

DETAILED DESCRIPTION

Figure 1:
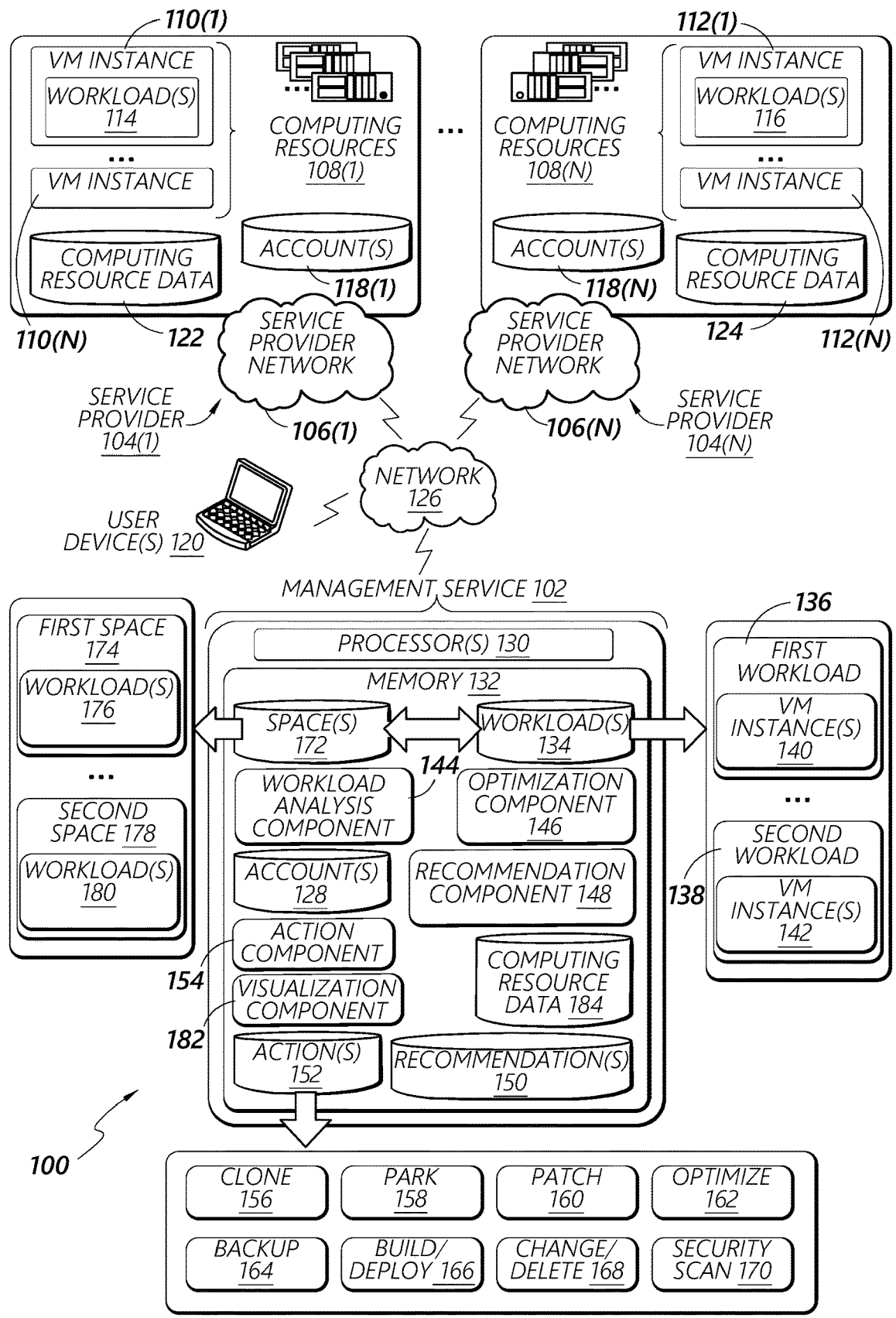
FIG. 1 illustrates an example system architecture for managing computing resources in accordance with one or more embodiments.

A growing number of users (e.g., businesses, individuals, subscribers, etc.) are subscribing to service providers for their computing resource needs (e.g., Infrastructure-as-a-Service (IaaS), Platform-as-a-Service (PaaS), etc.). Service providers (e.g., AMAZON WEB SERVICES®, MICROSOFT AZURE®, etc.) offer various network-based or cloud-based services and users often pay based on the amount of computing resources provisioned. Such computing resources may include, but are not limited to, computing or processing power (e.g., virtual servers, auto scaling, load balancing, etc.), data storage and delivery (e.g., object storage, file system storage, block storage, etc.), database management (e.g., relational databases, database migration, caching, etc.), networking (e.g., virtual private cloud, direct connections, domain name system, etc.), or any other type of cloud-based resource, commodity, or service.

Service providers operate networks (i.e., service provider networks) that include clusters of managed servers and VM instances (or other hardware-based computing devices) stored in data centers located across different geographic regions. Users may request that the service provider allocate computing resources in these data centers to support their computing workloads. Service providers receive these requests and allocate computing resources to support the workloads, such as usage of computer processors, memory, storage drives, computer network interfaces, and/or other hardware resources. As described herein, a workload is implemented by a designated set of computing resources, such as a VM instance, and the workload itself may be considered a code or logic that performs functionality using the designated computing resources. The service provider, or the service provider network may support a wide variety of workloads, such as but not limited to web servers, databases, user-facing applications, distributed data stores, batch processing, machine/deep learning training and/or inference, online gaming, video encoding, memory caching, and so forth.

As the service provider may support many different types of workloads, the service provider network may offer and provide users with a variety of VM instances. Generally, each VM instance may be allocated a different amount of computing resources and/or a different combination of computing resources such that the VM instances are optimized to support their respective workloads. For example, one VM instance may be allocated a larger amount of compute (e.g., processor cycles) and optimized to support compute-heavy workloads, while a second VM instance may be allocated a larger amount of storage (e.g., disk space) and optimized to support storage-intensive workloads.

While a large variety of VM instances are advantageous for various reasons (e.g., efficient utilization of computing resources, high performance for workloads, etc.) it becomes difficult to select a suitable or appropriate VM instances to support workload(s). For example, users may struggle to forecast computing demands of the VM instances. In some instances, users may go through a time-consuming trial-and-error process to analyze a performance of their workloads using different VM instances. Such process is not only time consuming but may result in workloads being hosted on VM instances that are overutilized, underutilized, or constrained. As a result, users may find it difficult to select VM instance(s) that are optimized to support their workload(s).

Users may also find it difficult to manage, optimize, and/or perform actions on workload(s). In some instances, although users are permitted to manage computing resources through the service provider, such process is often tedious. For example, users are often required to individually update, optimize, or perform actions on the computing resources. For some users, this process may be intensified based on the number of workload(s) and/or whether the workloads are provisioned across service provider(s) and/or service provider network(s). Accordingly, users may find it difficult to optimize workloads or perform batch operations on workloads.

In light of the above, this disclosure describes, in part, techniques and technologies for managing and/or optimizing computing resources, such as across an IaaS platform, PaaS, etc. In some instances, a management service may manage and/or optimize the computing resources to support workloads on behalf of the users. The management service may logically group workloads and VM instances provisioned across service providers/service provider networks. For example, the management service may permit users to group workload(s) into containers, groups, or spaces. In this way, users may perform batch operations on the workload(s) (or VM instances) within the spaces. Further, the management service may monitor the workloads to optimize performance and/or reduce underutilization. For example, the management service may identify underutilized computing resources within the service provider networks. In some instances, the management service may analyze the workloads and/or VM instances to monitor a health, performance, and/or utilization of the workload for use in determining different VM instances, configurations, and/or modifications in order to optimize performance and/or utilization. Based on the analysis, the management service may provide recommendations to improve workload performance and in some cases the management service may automatically make changes to underutilized instances to optimize the instance based on customer preferences and approvals.

The management service may provide a framework that allows users to import, discover, or access computing resources that are provisioned across service provider networks. The management service permits users to import instances of the computing resources provided by the service provider networks for use in managing the workloads of the user. For example, users may create an account(s) with the management service and import workloads and their associated computing resources. In some instances, the management service may import instances of the provisioned computing resources (e.g., architectures) and VM instances. In some instances, the users may selectively import certain workloads and their associated computing resources. Further, as part of this process users may enter login credentials and/or indicate the service provider network the computing resources are located on.

In some instances, the management service may also import or receive data associated with the characteristics of the computing resources. For example, upon entering login credentials and/or other identifying information (e.g., account number with the service provider network), the service providers may provide the management service (or components thereof) with access to one or more databases, web-based application program interfaces (APIs), etc. to obtain data associated with the computing resources. In some instances, the characteristics may include, or represent, computing resources that are available or provisioned, trends in consumption over time (e.g., peak usage, weekly, daily, etc.), changes in the consumption and/or what caused the changes in consumption, security concerns, when workload(s) are backed up, when workload(s) are created/deleted, security (e.g., monitoring and controls, identity and access, data protection, infrastructure protection, incident response, etc.), reliability (e.g., prevent failures, recovery management, SLA management, etc.), and/or any other characteristics associated with the provisioned computing resources. In some instances, the management service may continuously or periodically poll or transmit requests to the service providers to obtain the data representative of the computing resources. Using this data, the management service may monitor the computing resources across the service provider networks. For example, the management service may monitor changes in characteristics of computing resources over time.

As noted above, users may permit the management service to collect the data associated with their workloads across the service provider networks to help optimize workloads, VM instances, and/or otherwise manage their provisioned computing resources. For example, the management service may determine, for a workload, how much memory is reserved for a VM instance, an amount of compute or processing power, performance efficiency (e.g., monitoring for performance and utilization, managing efficiency over time, new services, etc.), cost optimization (e.g., rightsizing, waste elimination, efficient buying, spend management, new services, etc.), operational management (e.g., change management, release management, system monitoring, etc.), and/or other parameters.

The management service may provide recommendations to optimize performance of the workloads. For example, using the data received from the service provider and/or based on an analysis of the management service, the management service may determine recommendations to optimize workloads. In some instances, optimizing the workload(s) may increase the utilization of the computing resources to more effectively meet the computing resource needs of users. For example, as service provider networks offer a variety of different types of instances (e.g., elastic compute cloud instances, load balancing, relational database service, simple storage service, etc.), the management service may determine which VM instance type(s) are most suitable for the user. In other words, as service provider networks may offer a selection of VM instance types that are optimized, or biased, to support different use cases, the different VM instances may provide users with flexibility to choose VM instances that are optimized to support their workloads. In addition, the management service may automatically make changes to instance sizes based on customer preferences and approvals. By way of another example, optimizing workload(s) may also include performing certain actions on the workloads, such as parking, or pausing, workload(s) at certain times or day or according to a particular schedule.

As mentioned above, the management service may allow users to group workloads into spaces to provide users more control over their workloads and VM instances. Allowing users to selectively organize their workloads into spaces may give users the ability to efficiently view, organize, and perform actions on workload(s). In some instances, users may group the workloads into spaces based on one or more criteria and/or user preferences. For example, the workloads may be grouped into spaces based on the service provider networks, VM instance, business unit, project, end user, security groups, department, deployment, and so forth. In this way, users may customize a grouping of workloads for use in assessing the health, managing, or optimizing a particular set of workloads. By grouping workloads into spaces, users may perform batch actions on the workloads, such as controlling security, backup and disaster recovery, parking, and so forth. Such batch processing may reduce user involvement and eliminate the need to perform individual actions across workload(s) and/or service provider networks. For example, VM instances are often not replicated across regions or data centers unless specifically done so by the user. Grouping the workloads into the spaces permits batch processing across the workloads and for all geographic regions or across geographic regions, for example. By way of example and not limitation, example actions may include creating/provisioning VM instances, migrating VM instances, or parking VM instances across all workloads (or certain defined workloads) in the space. The management service may therefore provide a centralized, unified, stand-alone interface to operate across the different service provider networks to give users the ability to manage workloads and provide users flexibility in managing sophisticated computing resources in a unified and intuitive way.

Each action may also be associated with a particular workflow, or series of tasks, to perform the action. In some instances, the workflow may be based at least in part on the service provider network and/or the computing resources (or VM instances) provisioned to perform the workload. Moreover, given that workloads may be provisioned across service provider network(s), and/or a particular space may include workloads provisioned across the service provider networks, multiple workflows may be run to perform the actions. In some instances, the workflow may include tasks such as alerting, providing notifications, compliance, authorizations, and so forth. Accordingly, when an action is performed, the management service may perform the workflow associated with the action to cause the action to be performed.

In performing actions on the workloads and/or spaces, the management service may ensure compliance with certain compliance frameworks (e.g., HIPAA). For example, certain actions or workflows may be modified or changed to comply with certain frameworks in order to ensure that the actions being performed result in the workloads being in compliance.

The management service may offer visualizations, or topologies, associated with the users provisioned computing resources. The visualizations may include displays or other graphics that visually illustrate the computing resources (e.g., provisioned VM instances) across service providers. In some instances, the visualizations may include indications associated with which computing resources are optimized or underutilized, which computing resources have security concerns, which computing resources are being used the most, which computing resources are healthy, and so forth. In some instances, the visualizations may display the workloads in their respective spaces. Additionally, the visualizations may display the interconnectedness or relations amongst computing resources. Further, a relative size, color, and/or shape of the computing resources may indicate a level of importance, areas of concern, areas of opportunity/ optimization, and so forth. These relative sizes may be used to visually indicate where the users should, or may want to, focus their attention to optimize their computing resources. Users may also specify times or dates associated with the visuals to provide temporal views. Accordingly, users may utilize the visualizations to provide a pictorial view of the computing resources and their characteristics for use in managing computing resources.

In some instances, the management service may provide an estimated cost savings associated with optimizing the workloads and/or performing actions on the spaces and/or workloads. For example, in the event that a VM instance is underutilized for a workload, the management service may access costs or resources of the service provider to determine costs associated with provisioning a new VM instances for the workload. Moreover, the management service may present an estimated cost savings associated with the optimization and/or action before performing the action, thereby providing the user with an upfront assessment prior to deploying VM instances, for example.

In some instances, the management service may charge the user based on the actions to be performed, the compliance scheme, the amount of time it takes the management service to perform the actions, and so forth. Moreover, in some instances, the charge may be associated with the particular action or the number of tasks (i.e., the workflow) of the action and/or how may spaces and/or workloads the action in being performed on.

In some instances, the management service, or the account(s) may be associated with role-based access to perform actions on the workloads. For example, only authorized users have certain privileges to perform certain actions (e.g., executive, administrations, etc.). Additionally, different roles may be associated with different spaces of workload(s). For example, particular spaces and/or workloads may be associated with particular roles. Such role-based provisioning may allow certain users with more privileges or access than others.

Moreover, in some instances, the management service may optimize workloads on behalf of users. For example, users may select an option or "opt in" to give the management service permission to automate the optimization of workloads or perform actions on the workload(s) and/or spaces. For example, as described above, after determining the recommendation, the management service may automatically perform actions associated with the recommendations. As an additional example, through opting in, the management service may continually scan the workload(s) of the user to determine whether there are potential areas of optimization. In some instances, the users may set guidelines or parameters associated with the management service automatically performing the actions (e.g., cost thresholds, time, schedule, etc.). For example, the management service may perform certain actions to stick within a budget or to perform certain actions to optimize the users return-of-investment.

Using the computing resource data or the utilization data, the management service may offer peer-reviews or rankings amongst users. In some instances, users may be ranked against their peers depending on how optimized their workloads are or the amount of savings associated with their workloads. For example, a user with optimized computing resources (e.g., right-sized VM instances) may receive a higher ranked that a user with non-optimized computing resources (e.g., underutilized VM instances). Additionally, or alternatively, users may be ranked in comparison to one another based on their cost savings when optimizing their workloads. Users may also be connected to provide suggestions to one another, or rate one another, to further optimize and/or manage their computing resources. In such instances, users may be provided badges, credits, pins, or rewards based on their workload performance. Such instances may be used to compare users across an industry for peer-review.

Thus, this application describes techniques that increase the overall utilization of computing resources provided by a service provider network. The management service may determine VM instance(s) (or types) that are appropriately tailored or allocated to support workloads of users. In this way, the techniques may help prevent underutilization of computing resources of a service provider network, which may reduce the amount of computing resources that are allocated or reserved for VM instances. In such instances, each workload and/or VM instance may be monitored, analyzed, and/or optimized to give the highest performance at the lowest costs. Accordingly, as users pay based on the amount of VM instance(s) used, or on a per-use basis (pay as you go), typically by the hour, week, or month, the underutilization of VM instances may lead to unnecessary costs. Further, the management service may allow users to create spaces of workload(s) for centralizing the management of workload(s) across service provider networks. Such centralization may allow users to perform batch operations on the workload(s) within the space.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein.

FIG. 1 illustrates a system-architecture diagram 100 of an example environment in which a management service 102 provides a service that allows users or developers to manage computing resources across multiple service providers 104(1)-104(N). The service providers 104(1)-104(N) may operate and/or manage service provider networks 106(1)-106(N), respectively. The service providers 104(1)-104(N) may comprise or be associated with any type of entity that provides various cloud-based and/or cloud-accessible computing resources. In various examples, the service providers 104(1)-104(N) may be any of, or any combination of, server(s), platform(s), console(s), computer(s), etc. which provides these cloud-based computing resources. The service providers 104(1)-104(N) may be operated and/or associated with an entity, such as an organization, company, institution, etc. In some instances, the service providers 104(1)-104(N) are referred to as "cloud computing services 104(A)-(N)."

The service provider networks 106(1)-106(N) may include computing resources 108(1)-108(N) stored in data centers located across the different geographic regions. Generally, the computing resources 108(1)-108(N) may provide various types of computing resources, such as compute resources for processing data, memory resources (e.g., physical devices capable of storing information such as RAM or ROM), storage resources (e.g., disk storage or drive storage used to store data by various electronic, magnetic, optical, or mechanical changes to a surface layer of one or more rotating disks), GPUs, and/or network resources (e.g., to facilitate network communication, to determine average or measured rate of bit transmission per second over networks or other metrics, etc.). Additionally, computing resources 108(1)-108(N) may be various types of computing devices, such as devices that have different chip set generations, are from different vendors, have different hardware architectures, and so forth. In some instances, the computing resources 108(1)-108(N) may comprise any type of network-based resource or instance, including but not limited to computing or processing power, data storage and delivery, database management, and networking. The computing resources 108(1)-108(N) may be partitioned into virtual and/or physical partitions which correspond to user computing needs. In this way, the service provider networks 106(1)-106(N) may provide various services to fulfil computing resource needs of user.

The computing resources 108(1)-108(N) may be hardware, firmware, software, and/or any other type of resources. In examples, the computing resources 108(1)-108(N) may execute/implement virtual machine (VM) instances. As shown in FIG. 1, the computing resources 108(1) may include VM instances 110(1)-110(N) and the computing resources 108(N) may include VM instances 112(1)-112(N). The computing resources 108(1)-108(N) may each support VM instances that may be different types of VM instances provided by the service provider networks 106(1)-106(N), respectively. For example, computing resources 108(1)-108(N) may support one or more VM instances of a first type and one or more VM instances that are of a second VM instance type.

The VM instances 110(1)-110(N) and 112(1)-112(N) may emulate computing devices that operate and/or support workloads 114 and 116, respectively. The VM instances 110 (and/or workloads 114 and 116) may implement their own operating systems, processing capabilities, storage capacity, and/or network interfaces. A workload may include a discrete capability, functionality, etc. that is implemented by one or more computing resources (e.g., compute, memory, storage, networking, etc.) in the computing resources 108(1)-108(N). A workload may include and/or be implemented as code or logic that is executed by one or more computing resources to perform the capability, functionality, etc. The service provider networks 106(1)-106(N) may support a wide variety of workloads, such as web services, database services, applications (e.g., user-facing applications, back-end applications, etc.), distributed data store services, batch processing, machine/deep learning training and/or inference, online gaming, video processing (e.g., encoding, decoding, etc.), memory caching, and/or any other type of workload that can be supported by computing resources 106(1)-106(N). In some instances, a workload is defined to perform a purpose, such as implementing a website for a company (e.g., e-commerce website, marketing website, etc.), implementing an Enterprise Resource Planning (ERP) service for a company, implementing an analytics platform, implementing an Artificial Intelligence algorithm/technique, etc. As such, the workloads 114 and 116 may comprise a wide variety of workloads and may be implemented on a wide variety of VM instances 110(1)-110(N) and 112(1)-112(N), respectively. The service provider networks 106(1)-106(N) may have large amounts of workloads, hosted or supported on a wide variety of VM instances of different types to a wide variety of workloads with different resource-consumption characteristics. In some embodiments, a workload may be defined by the management service 102 and/or the user device(s) 120. For example, the management service 102 may interface with a user on the user device(s) 120 to receive input designating a workload and/or computing resources that are implemented to facilitate the workload. However, in other embodiments, a workload is defined by a service provider.

Each VM instance is associated with an operation cost (e.g., often computing resources) depending on the type of compute, memory, and/or storage capabilities. This enables users to select an instance type that best fits the needs of a specific workload. The service providers 104(1)-104(N) may provide interfaces for defining workloads and/or the VM instances that operate the workloads. The service provider networks 106(1)-106(N) may provision the computing resources 108(1)-108(N) to facilitate the creation or defining of the workloads and/or VM instances.

The users (e.g., customers, developers, providers, etc.) of the service provider networks 106(1)-106(N) may utilize user account(s) 118(1)-118(N) of the service provider networks 106(1)-106(N), respectively, for accessing and/or managing the computing resources 108(1)-108(N). Further the VM instances and/or the workload(s) may be updated by the user via accessing an interface of the service provider networks 106(1)-106(N). In some instances, users may create the user accounts 118(1)-118(N) across the service provider networks 106(1)-106(N) to utilize their resources and services. For example, the users may utilize user device(s) 120 to communicate over a network 126 (e.g., WANs, PANs, LANs, etc.) with the service provider networks 106(1)-106(N).

The service provider networks 106(1)-106(N) may periodically take snapshots and receive characteristics of the computing resources 108(1)-108(N). The snapshots may be represented as computing resource data 122 and 124 of the service provider networks 106(1)-106(N), respectively. In some instances, the computing resource data 122 and 124 may represent a state or status of the computing resources 108(1)-108(N). Additionally, in some instances, the service provider networks 106(1)-106(N) may monitor events that occur on the computing resources 108(1)-108(N) and provide and/or store data and/or notifications representing the changes in the characteristics of the computing resources 108(1)-108(N). In some instances, the changes may represent an addition of a VM instance, deletion of a VM instance, a modification of a VM instance, a change in at least one of a state, a status, or configuration of a VM instance, a change in a price, a rate, or a cost of a VM instance, a change in a relationship between VM instances, a change in usage for a VM instance or a group VM instances, a change in a security associated with a VM instance, etc. In some instances, the computing resource data 122 and 124 may include an event log associated with of events and timing when the events occur and what computing resources 108(1)-108(N) were/are affected. In some instances, such changes, or the computing resource data 122 and 124 may be stored in the accounts 118(1)-118(N) of the service provider networks 106(1)-106(N).

The management service 102 may operate as a software-as-a-service (SaaS) and comprise one or more components configured to obtain data from the service provider networks 106(1)-106(N) for use in managing the computing resources 108(1)-108(N). In some instances, the management service 102 may comprise any of, or any combination of server(s), platform(s), console(s), computer(s) and so forth that are configurable to perform techniques for managing the computing resources 108(1)-108(N) within the service provider networks 106(1)-106(N). Although the management service 102 is illustrated as being associated with a separate entity than the service provider networks 106(1)-106(N), in some examples, the service provider networks 106(1)-106(N) and the management service 102 may be associated with the same entity, or any number of entities, configured to perform the operations described herein.

The management service 102 supports an API framework that allows users, or developers, to manage the computing resources 108(1)-108(N) and/or services across the service provider network 106(1)-106(N). The management service 102 may communicate with the service provider networks 106(1)-106(N) via the network 126. The management service 102 may receive the computing resource data 122 and 124 associated with the provisioned computing resources 108(1)-108(N) on the service provider networks 106(1)-106(N), as well as information stored in the user accounts 118(1) and 118(N). Such information may be utilized by the management service 102 to identify the computing resources 108(1)-108(N), the VM instances 110(1)-110(N) and 112(1)-112(N), and the workloads 114 and 116 associated with the users. The management service 102 may store account(s) 128 associated with the user and identify the accounts 118(1)-118(N).

As illustrated, the management service 102 may include processor(s) 130 and memory 132 that includes various components or instructions, when executed by the processor(s) 130, cause the processor(s) to perform various actions. The memory 132 may have access to various components, modules, engines, datastores, and so forth to carry out the operations of the management service. For example, as discussed above, the management service 102 may access and/or receive indications of the computing resources 108(1)-108(N) provisioned on the service provider networks 106(1)-106(N). The management service 102 may store the workloads and/or VM instances in a workload(s) database 134. As shown in FIG. 1, the management service 102 may associate the VM instances that are provisioned on the computing resources 108(1)-108(N) with the workloads. In some instances, users may import or identify particular workloads and/or VM instances within the service provider network 106(1)-106(N). In doing so, users may be allowed to manage certain workloads and/or VM instances among their computing resources 108(1)-108(N). For example, as shown in FIG. 1, the user may import a first workload 136 and a second workload 138 among the workload(s) 114 and/or the workload(s) 116. Moreover, users may also import the VM instances that are associated with the first workload 136 and the second workload 138. That is, VM instance(s) 140 and VM instance(s) 142, among the VM instances 110(1)-110(N) and VM instances 112(1)-112(N), may be imported (or added) by the user and associated with the first workload 136 and the second workload 138. Accordingly, the management service 102 may include components to import, discover, and provide access to the accounts 118(1)-118(N) of the service provider network(s) 106(1)-106(N) (e.g., integration component/module).

A workload analysis component 144 may be employed by the management service 102 to perform various activities, such as monitoring the computing resources 108(1)-108(N) and/or collecting the computing resource data 122 and 124. For example, the workload analysis component 144 may receive the computing resource data 122 and the computing resource data 124 from the service provider network 106(1)-106(N), which may be stored in association with the account(s) 128 of the user at the management service 102. The management service 102 may also store the computing resource data 122 and 124 as computing resource data 184. As discussed above, in some instances, the computing resource data 122 and 124 may indicate or represent a utilization in memory by processes running inside the VM instance, CPU usage, how many concurrent file handles are allowed, security concerns, backup, downtime, crashes, and/or other parameters. Moreover, as users may update VM instances or workloads via accessing an interface of the service provider networks 106(1)-106(N) (or of the management service 102), to maintain up to date, the management service 102 may continuously poll the service provider networks 106(1)-106(N) to determine whether the VM instances and/or the workloads have undergone a change (e.g., update, software change, traffic change, etc.). Such determinations may be used to update the account(s) 128, the computing resource data 122 and 124 (or the computing resource data 184), the workloads 114 and 116, and/or the VM instances 110(1)-110(N) and 112(1)-112(N). In some instances, the management service 102, or a component thereof, may periodically, or continuously, poll the service provider network(s) 106(1)-106(N) to receive the computing resource data 122 and 124. Additionally, the workload analysis component 144 may receive incoming messages from the service provider networks 106(1)-106(N) that indicate the status or state of the computing resources 108(1)-108(N) (or the computing resource data 122 and 124).

In some instances, the management service 102 may utilize the computing resource data 122 and 124 for use in monitoring the computing resources 108(1)-108(N). As discussed above, the computing resource data 122 and 124 may comprise representations of the consumption, usage, and characteristics of the computing resources 108(1)-108(N). In some instances, the workload analysis component 144 may determine a utilization of the VM instance(s) based on the computing resource data 122 and 124. Such utilization may indicate the average and/or peak computing resource consumption of a VM instance over a configurable period. Additionally, the workload analysis component 144 may determine how well the workloads 114 and 116 are performing (e.g., health, security, etc.). Accordingly, the workload analysis component 144 may monitor a status of the computing resources 108(1)-108(N).

The management service 102 may include an optimization component 146 that functions to optimize a performance of the workloads or computing resources. For example, the optimization component 146 may analyze results of the workload analysis component 144 and/or the computing resource data 122 and/or 124 to determine modifications that, when implemented, optimize the workloads 114 and 116 and/or VM instances 110(1)-110(N) and 112(1)-112(N). For example, the optimization component 146 may determine a VM instance that support workloads of the users and which optimize performance of the workloads. In doing so, the optimization component 146 may determine VM instances that prevent underutilization or overutilization of the computing resources 108(1)-108(N).

In some instances, the optimization component 146 may use various techniques, such as workload simulation, to determine whether the workloads may be optimized. For example, the workload simulation may determine whether a new VM instance is more optimized for the workload than the currently utilized VM instance. That is, as discussed above, as the service providers 104(1)-104(N) may offer a wide variety of VM instances that differ based on the amounts of physical computing resources allocated, the optimization component 146 may determine a most suitable or most utilized VM instance. As such, the optimization component 146 may provide insight regarding whether or not the new VM instances would optimize the workload. Such insight may translate to increased incurred costs for the user.

As an example, the optimization component 146 may determine whether the VM instances are rightsized such that the VM instances are allocated correct computing resources for their workload. Rightsizing the VM instances may reduce costs associated with operating the workloads while maximizing performance. As another example, the workload analysis component 144 may determine times at which VM instances are underutilized and the optimization component 146 may determine that the VM instances may be optimized by powering down or regulating computing resources of a VM instance. That is, many types of workloads do not need to be running at all hours of the day and during all days, the workload analysis component 144 may determine performance metrics from the computing resource data 122 and 124 to determine the average and/or peak resource consumption of a VM instance over a configurable period. In some instances, if these remain below a threshold, the optimization component 146 may determine that the VM instances may be optimized through updating, parking, or provisioning a VM instance, for example. As discussed herein, such indications may be used to recommend a change to a smaller, more appropriate VM instance. Ensuring that workloads are powered down, or parked, during certain hours of the day or during certain days of the week, month, and/or year may lead to increased cost savings. Accordingly, the workload analysis component 144 and the optimization component 146 may work in conjunction to identify areas of optimization.

The recommendation component 148 may generate recommendations 150 that indicate a modification to the workload and/or VM instance. For example, the recommendation component 148 may provide the recommendations 150 that includes at least a recommendation to optimize or increase a performance of the VM instance or the workload. In some instances, the recommendations 150 may include suitability/risk scores that indicate how suitable or optimized a VM instance is for the workload. Users may determine whether they want to apply the recommendations (or modification) and send a request (or instruction) back to the management service 102 to implement the modification.

Based on the recommendations 150, various action(s) 152 may be performed by the management service 102 to optimize the workloads. In some instances, the management service 102 may include an action component 154 for performing the action(s) 152. Individual actions 152 may correspond to operations performed by the management service 102 to implement the recommendation(s) 150 and/or otherwise perform actions associated with the workloads. For example, depending on the recommendations 150, the action component 154 may perform a corresponding action(s) 152.

In some instances, the actions 152 may each be associated with a workflow, or series of steps or operations to carry out or perform the action. In some instances, the workflow may include tasks/steps, such as alerting, providing notifications, sending requests, receiving data, communicating with a service provider/device/system/application/function/etc., determining compliance, receiving authorization/approval (e.g., from a user/system), and so forth. In some instances, a task may be performed by a system/device, while in other instances a task may be performed by a user. In some instances, the user may define the workflow and/or the management service 102 may define the workflow. In some instances, the workflow may be based at least in part on the service provider network and/or the computing resources 108(1)-108(N) (or VM instances) provisioned to perform the workload. Given that workloads may be provisioned across service provider network(s), and/or a particular space may include workloads provisioned across the service provider networks, multiple workflows may be performed to carry out the actions. For example, a space may include a first workload provisioned on a first service provider network and a second workload provisioned on a second service provide network. Causing an action to be performed on the space may include causing a first workflow associated with the first workload to be performed and causing a second workflow associated with the second workload to be performed. In such instances, the first workflow and the second workflow may respectively cause the action to be performed on the first workload and the second workload.

In some instances, a workflow may include a schedule (which may be determined by the management service 102) indicating when or an order of performing tasks/steps. For example, to park a workload, a specific workflow may be performed that includes initiating a power down of a first computing resource at a specific time, waiting until the first computing resource is powered down, and then initiating a power down of a second resource.

As illustrated in FIG. 1, in some instances the actions 152 may include a clone action 156, a park action 158, a patch action 160, an optimize action 162, a backup action 164, a build/deploy action 166, a change/delete action 168, and a security scan action 170. However, the actions 152 may be associated with other commands performable by the management service 102 and/or the service providers 104(1)-104(N) (or the service provider networks 106(1)-106(N)), such as managing the computing resources 108(1)-108(N), provisioning VM instances, migrating workloads between VM instances, providing auto-scaling for fleets of VM instances, configuring VM instances and/or workloads 136. In some instances, based on the selected action 152 and the corresponding workflow, the management service 102 may call or instruct services in the service provider networks 106(1)-106(N) to perform actions (e.g., scaling and/or descaling resources based upon demand for the resources and/or other factors).

The clone action 156 may include cloning the workload onto other computing resources (e.g., copying the workload and any associated data, such as configuration data, to implement the workload on a second set of computing resources). The park action 158 may park or pause the VM instance according to a predetermined or selected schedule (e.g., setting the VM instance to an inactive state). By way of example, the optimization component 146 may determine that the workload is being underutilized during 7 p.m. and 7 a.m. of all days of the week. Therein recommendation component 148 may output a recommendation that includes shutting down the VM instances at 7 p.m. each night and powering the VM instance back up at 7 a.m. Accordingly, the park action 158, or the workflow associated with the park action 158 may include a power schedule that allows users to configure a schedule to shut down and restart VM instances such that the VM instances are not running overnight or on the weekend when nobody is using them. In such instances, however, the park action 158 does not terminate VM instances, but may prevent the VM instances from running. In doing so, the techniques herein may park VM instances during non-peak hours and then start them again when their capacity is needed. As such, users may still be billed for storage provisioning of the computing resources, but may not be charged for compute power while the VM instances are not running. The patch action 160 may include patching the workloads to update (e.g., security), fix, or improve the workloads. The optimize action 162 may include performing actions to optimize the workloads (e.g., based on new technology, such as serverless). The backup action 164 may include backing up the workload such that the workload may be restored in the event of a data loss. The backup action 164 may restore an entire workload rather than representing a snapshot in time. The build/deploy action 166 may include provisioning a new instance of a computing resource, such as a VM instance, in response to an increase in demand for a network service or other condition. The change/delete action 168 may include de-provisioning a VM instance and/or workload, migrating a VM instance, or changing VM instances. The security scan action 170 may include testing the vulnerability of the workloads, or vulnerabilities within the workload.

In some instances, the management service 102 may automatically perform the actions 152. For example, users may opt-in to have the action component 154 perform the recommendations and/or the actions, without user intervention. Additionally, or alternatively, the user may opt-in to allow the management service 102 to automatically optimize or perform actions on the workload and/or VM instance to increase the performance. In such instances, the management service 102 may automatically perform the recommendation to optimize performance of the VM instance to support the workload. In some instances, the users may define parameters around which recommendations and/or actions the management service is configured to perform.

Once the action component 154 performs the action associated with the recommendation, the management service 102 may receive the computing resource data 122 and 124 and the workload analysis component 144 may continue to analyze the computing resource data to track changes and adjust recommendations accordingly. As such, the management service 102 may continually, or periodically, analyze the computing resource data and determine if the workloads are optimized. For example, in the event that the action component 154 provisions a new VM instance type, the management service 102 may perform operations to determine if the new VM instance is more appropriate for the workload than the current VM instance. For example, if the CPU, memory, or VM instance type is changed such that the VM instance is optimized, the recommendation may be removed from the recommendations.

The management service 102 may provide users the option of grouping or organizing workloads into spaces 172. In some instances, users may group workloads based on certain parameters. As an example, certain workloads may scale at different times of the day and users may wish to group these workloads into a space for controlling or managing a portion, or all, of the workloads in the space. For example, game-hosting servers may scale more during the day, or certain hours of the day, such as evenings when players are no longer working. Here, workloads associated with the game-hosting servers may be grouped into one or more spaces. Users may optimize this space (and the workloads) by provisioning new VM instances to accommodate for the peak in gaming, and may de-provision or reduce the VM instances during non-peak hours. The spaces 172 may also be associated with a specific type of computing resources (e.g., compute resource, storage resource, database resource, VM resource, etc.), a specific service provider network, function, etc. role, and so forth. For example, users may group workloads into particular spaces depending on the actions to be performed on the workloads (or space). In some instances, users may create as many spaces 172 as desired and according to personal preferences. Moreover, users may also define which workloads 134 (i.e., the workloads 114 and 116) are within the spaces 172, respectively. For example, the first space 174 may include workload(s) 176 and the second space 178 may include workload(s) 180. In such instances, users may import or operate on any number of workloads within the spaces. For example, users may place any number of workloads into the spaces in order to operate (or perform actions) on the workloads within the space.

In some instances, the spaces 172 may be utilized to perform batch operations on the workloads within the space. Users may take actions on groups of resources (e.g., applying patches to all resources in a group), applying security changes to groups of VM instances, backing up and disaster recovery, and/or performance related actions. In some instances, grouping the workloads into spaces may create a flexible environment that supports changing workloads. In other examples, the management service 102 may recommend parking the workload, or modifying a VM instance during a particular period of time, to save costs. For example, as shown in FIG. 1, the spaces 172 may include the first space 174 and the second space 178 and users may perform batch operations or actions rather than individually optimizing or performing actions on the workloads. Such process is tedious and may require logging into different accounts one by one to perform the separated or piloted actions to optimize the workloads.

In some instances, the account(s) 128 may include or identify role-based access to perform certain action(s) (e.g., change and deploy VM instances). Based on the role of the user, the management service 102 may present or display certain characteristics and/or permit certain actions. For example, only authorized personnel have privileges to perform actions. Roles may also be utilized to reduce waste and/or prevent going over budget (e.g., budgets by role). Users may organize a dashboard or workspace depending on their preferences and/or role. For example, users may organize the workloads into spaces to monitor and react quickly to business needs. As an example, a particular user may create a space for managing confidential information and import workloads including confidential information. Here, the user may quickly utilize the space for determining a performance, or health, of the space having the confidential information to identify potential concerns (e.g., patching and deploying updates). While such grouping of workloads may not be of importance to other users and/or roles, for the particular user, it's a way for them to quickly determine the status and health of the workloads including confidential information.

The management service may also include a visualization component 182 that presents displays of visualizations to provide snapshots, change notifications, health information, and/or utilization of the computing resources. The displays may provide users with a visually-based solution to quickly monitor and manage computing resources. Such visualization makes it easy to see important events, alerts and information occurring in the workloads and VM instances. For example, the computing resource data 122 and 124 provided by service provider networks 106(1)-106(N) may be provided in unintuitive ways and are often difficult to analyze. Additionally, the computing resource data 122 and 124 may simply be snapshots at a particular point in time which may not be helpful to a user without any context of how the computing resources behaves at other points in time. In some instances, the visualization component 182 may permit users to see spaces, workloads, and VM instances on one screen with an intuitive navigation to allow users to switch between deployments and view relevant info such as events, alerts, storage/compute costs, etc.

The visualization component 182 may transform data provided by the service provider networks 106(1)-160(N) into a visualization that represent changes, performances, or other characteristics of the workloads and/or VM instances. In some instances, the visualization component 182 may include one or more components configured to apply one or more rules or algorithms to convert the data into a description that, when presented on a display, visually represents the changes, performance, or other characteristics of the workloads and/or VM instances. For example, a change in a relationship between a first computing resource and a second computing resource may be visually indicated. For instance, at a first time, the first computing resource and a second computing resources may be included in the same space and protected by the same security provision (e.g., firewall). However, if the first computing resource is migrated into a different space protected by a different security provision, the visual representation of the changes in the characteristics of the network may graphically indicated that the first computing resource is in a separate space.

In other examples, the change in the characteristics of the computing resources 108(1)-108(N) may comprise a change in at least one of a state, a status, or configuration data of a resource of the cloud-based network of resources. As an example, the change in the characteristics of the computing resources may be caused by a change to a load balancer in the network which causes a state of one or more resources, their respective icon positions, and/or their representations in a diagram changed. In some instances, a computing resource may be represented by an icon and may have its status changed to one of a "park" or "run." In some instances, a computing resource whose status is changed to "park" may be represented by a dotted line, or certain color, while a computing resource that is "running" may be represented by a solid line, or different color.

In some instances, the visualization component 182 may receive requests from a user (e.g., the user device 120) for the visualization of the changes. In such examples, the request may include parameters, such as the one or more of the criteria of the set of criteria as well as the particular format in which the visualization is to be presented. Upon generating, the visualization component 182 may provide the visualization to the client device. The visualization component 182 may also provide particular visualizations according to user request. For example, a security topology may be depicted more appropriately as a graph while a cost topology may be more appropriately depicted as a histogram. Upon determining the appropriate visual representation, the visualization component 182 may format the visualization into a certain display. Moreover, one or more components of the management service 102 may determine relationships between various computing resources, such as security relationships, cost relationships, communication connection, provisioning relationships, or any other types of virtual or physical relationships between resources. Such relationships may be displayed in the visualizations provided by the visualization component 182.

The management service 102 may also store data regarding the action(s) 152 in connection with the account(s) 128. This way, the management service 102 may include an audit feature that logs or tracks who modified or added workloads and/or VM instances. The log may include various categories of information such as a time at which a change occurred, a resource affected by the change, a description of the change that occurred. For example, the log may identify that a change in the network occurred at 7:53:23 AM on Aug. 11, 2016.

As discussed above, users may interact with the management service 102 via the client devices 106 for optimizing, controlling, or managing the computing resources 108(1)-108(N). The client device(s) 120 may include any type of computing device, including, but not limited to, desktop computers, server computers, web-server computers, personal computers, mobile computers, laptop computers, tablet computers, or any other sort of computing device. The client device(s) 120 may include processors and computer-readable media. The client device(s) 120 may further include one or more network interface(s) (e.g., communication connections) to communicate over one or more networks, such as network(s) 126 to transmit and receive data from the management service 102 and/or the service provider network 106(1)-106(N). The network interface(s) may communicate or send a request to a web-based API to provide information related to the workloads. The request may include the criteria specifying various parameters usable by the management service 102 to create the appropriate visualization (e.g., time and date range, a type of the resources to be represented in the description, security information, network information, or other information which may define or restrict the description of the changes in the characteristics of the computing resources 108(1)108(N)). The management service 102 may accordingly present interfaces or dashboards for display on the client device(s) 120.

One or more processors (e.g., the one or more processor 130 of the management service 102, one or more processors of a service provider 104, one or more processors of the user device(s) 120, and/or any other processor) may include a variety of types of processors, such as one or more central processing units (CPUs), one or more microprocessors, one or more graphics processing units (GPUs), one or more digital signal processors (DSPs), etc. Alternatively, or additionally, in some instances, operations/functionality of one or more processors may be implemented as one or more hardware logic components, such as one or more application specific integrated circuits (ASIC), one or more field-programmable gate arrays (FPGAs), one or more program-specific standard products (ASSPs), one or more complex programmable logic devices (CPLDs), and/or the like.

Memory (e.g., the memory 132 of the management service 102, memory of a service provider 104, memory of the user device(s) 120, and/or any other memory) may include any suitable or desirable type of computer-readable media. For example, computer-readable media may include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other data types. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that may be used to store information for access by a computing device. As used in certain contexts herein, computer-readable media may not generally refer to communication media, such as modulated data signals and carrier waves. As such, computer-readable media should generally be understood to refer to non-transitory media.

Figure 2:
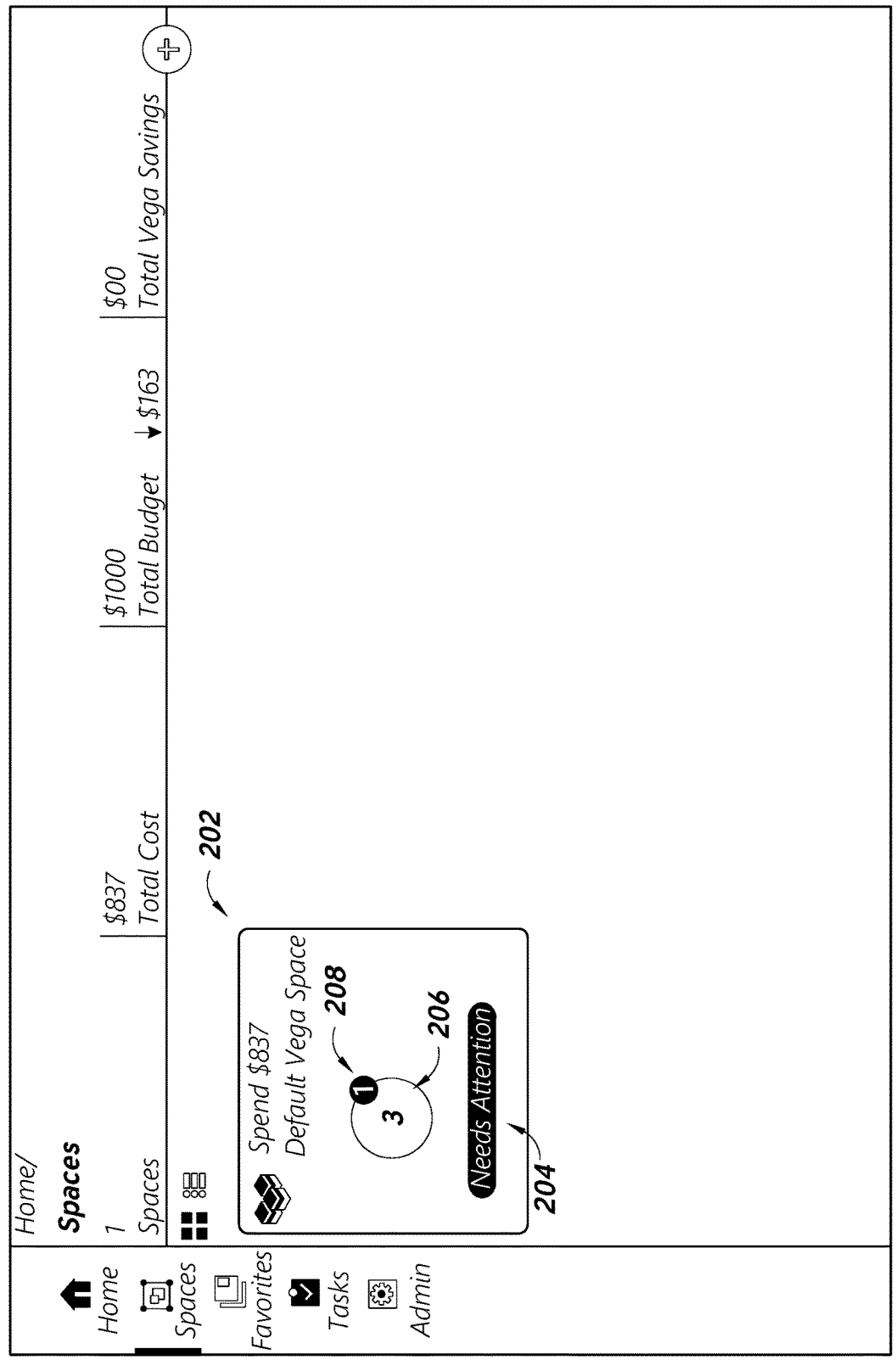
FIG. 2 illustrates an example user interface to provide a list of spaces associated with a user account in accordance with one or more embodiments.

FIG. 2 illustrates an example user interface 200 provided by the management service 102 that displays a list of spaces associated with a user account. The user interface 200 illustrates an example dashboard, portal, or interface through which users who have user accounts with the management service 102 may browse spaces, workloads, or VM instances. In this sense, the user interface 200 includes an inventory of deployed VM instances for compute, networking, database and storage associated with each workload. Generally, from the user interface 200, users are enabled to manage their workloads and VM instances. Users may also perform various operations to optimize their workloads and VM instances.

As shown in FIG. 2, the user account includes a space 202. In some instances, the user interface 200 may be presented after a user logs into their user account to view their spaces and/or workloads. The space 202 may represent a grouping of workloads or higher-level categories of workloads. Users may group the workloads into the space 202 based on user preferences or other criteria (e.g., service provider). For example, one space may be a database space and represent different database workloads supported by computing resources, while another space may be a web-server space and represent different web-server workloads supported by computing resources (e.g., web-server workloads associated with the same or a different service provider).

Additionally, as discussed above, user accounts may be assigned roles that permit certain actions or display certain views. For example, different users may desire different spaces and/or a configuration of spaces depending on their role within a business. In this sense, although the VM instances are physically defined on the service provider network, users may group workloads, or define spaces, according to their desires and irrespective of the actual physical location of the computing resources.

Traditionally, users may have to individually manage workloads. Such process, however, is tedious, given the number of workloads across datacenters. For example, for each region a user maintains workloads, users may have to navigate to each workload and provision new computing resources and/or optimize the workloads. The techniques discussed herein may perform actions across the workloads in the space 202. In doing so, the actions may be performed on the group of workloads to reduce user intervention.

The user interface 200 may indicate a number of workloads with the space 202. For example, as shown in FIG. 2, the space 202 includes three workloads 206. However, the space 202 may include more than three workloads. Additionally, the user interface 200 may include an indicator 204 associated with a current health, utilization, or status indicator of the space 202. In some instances, the indicator 204 may serve to notify or warn users of potential areas of concern to allow the user to make informed decisions when optimizing workloads within the space 202. Additionally, the indicator 204 may be associated with concerns that may compromise user experience (e.g., down server, performance issues, etc.). By defining spaces with certain workloads, or by role, for example, users may see the broader impact of the workloads within the space on the business group. Additionally, the indicator 204 may identify an amount or number of matters 208 that need attention (e.g., one, two, three, etc.) In some instances, the indicator 204 may include a textual explanation (e.g., optimize workload due to low utilization, security concern, overutilized, etc.). In some instances, the indicator 204, or a status of the space 202, may be determined from an average, or weighted average of the workloads within the space 202. For example, the management service 102 may accumulate and average all resource computing data associated with the workloads within the space 202 to generate or determine the status indicator of the space 202.

Figure 3:
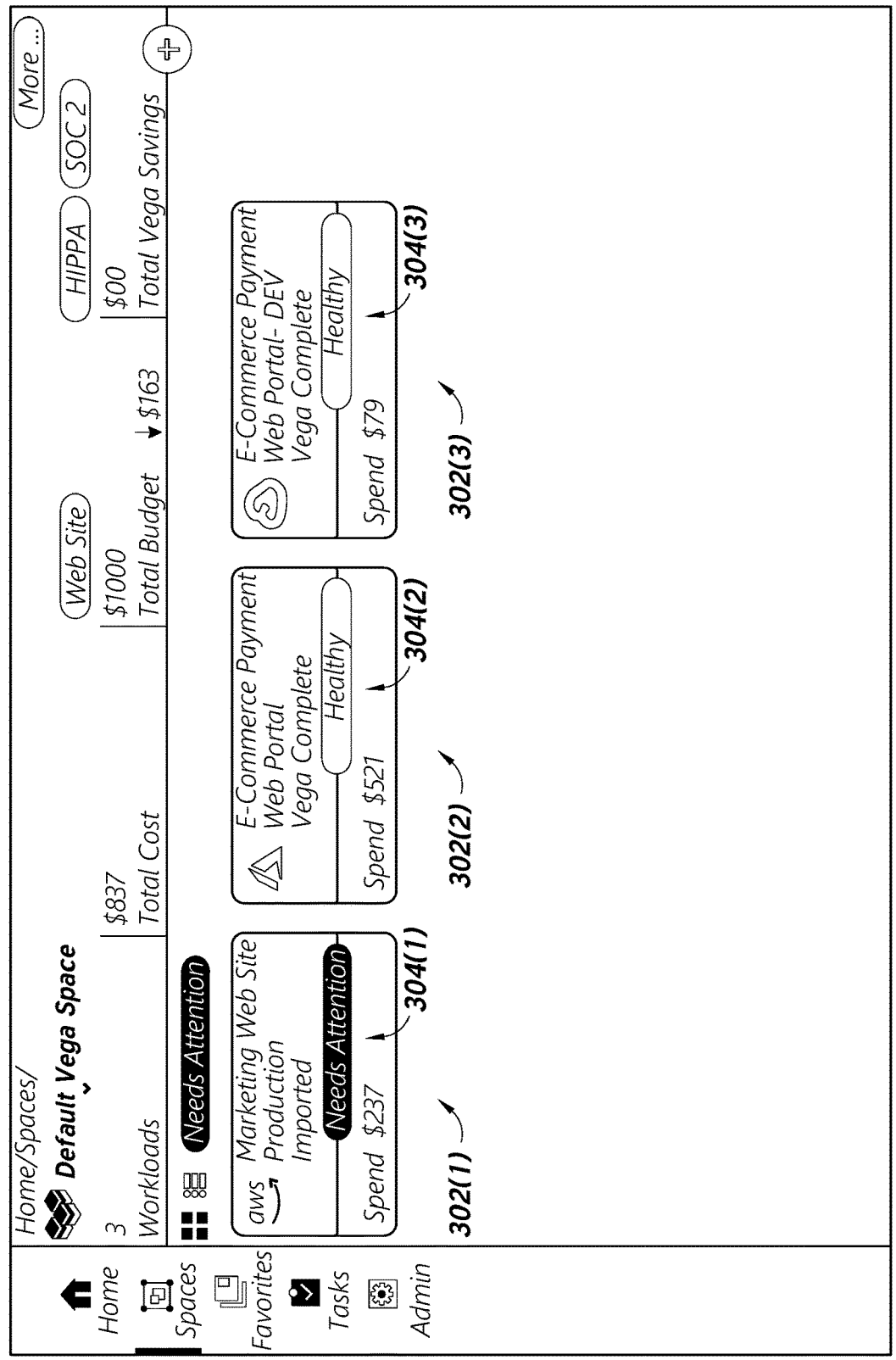
FIG. 3 illustrates an example user interface to provide information regarding workloads of a space in accordance with one or more embodiments.

FIG. 3 illustrates a user interface 300 provided by the management service 102 showing information regarding workloads 206 of the space 202. In some examples, the user interface 300 is presented in response to selection of the user interface element for the space 202 in FIG. 2. However, the user interface 300 may be presented in other contexts. Each of the workloads 206 may include an associated name, a cost associated with operating or running the workload, and/or a status indicator. For example, as shown, a first workload 302(1) is entitled "Marketing Web Site Production," a second workload 302(2) is entitled "E-Commerce Payment Web Portal," and a third workload 302(3) is entitled "E-Commerce Payment Web Portal-DEV." As discussed above, users may organize the workloads 206 into the space 202 and each of the workloads 206 may be associated with a workload on a VM instance from a service provider network.

Each of the workloads 206 may include an indicator that indicates a health or status to provide visibility into the workloads 206. In some instances, each workload may be represented with a green, yellow, or red instance (or other identifiers components) that provides a visual associated with the workloads 206, respectively. As shown, the first workload 302(1) may include a first indicator 304(1), the second workload 302(2) may include a second indicator 304(2), and the third workload 302(3) may include a third indicator 304(3). In some instances, the status indicators may be determined based on a performance of the computing resources associated with each of the workloads. Using the indicators, users may determine which workloads 206 within the space 202 need attention. For example, as shown in FIG. 3, the first indicator 304(1) indicates that it needs attention, while the status indicators of the other workloads indicate that the workloads are healthy. In some instances, the statuses of the workloads 206 may be determined via the management service 102 obtaining the computing resource data 122 and 124 (or the computing resource data 184) from the service provider networks 106(1)-106(N) and then determining their associated health.

Moreover, each of the workloads 206 may include an associated cost that corresponds to a cost that the user spends to provision the particular workload. These costs may be summed to indicate a cost of the space 202. Further, users may associate each space with a particular security setting or protocol. For instance, the user interface 300 illustrates that the workloads within the space 202 are to comply with HIPAA standards. Here, based on selecting the HIPAA standard, the management service 102 may scan the workload(s) 206 for unencrypted data to prevent deployment. In this sense, by organizing the workloads 206 into the space 202, users may manage more than one workload at a time.

Figure 4:
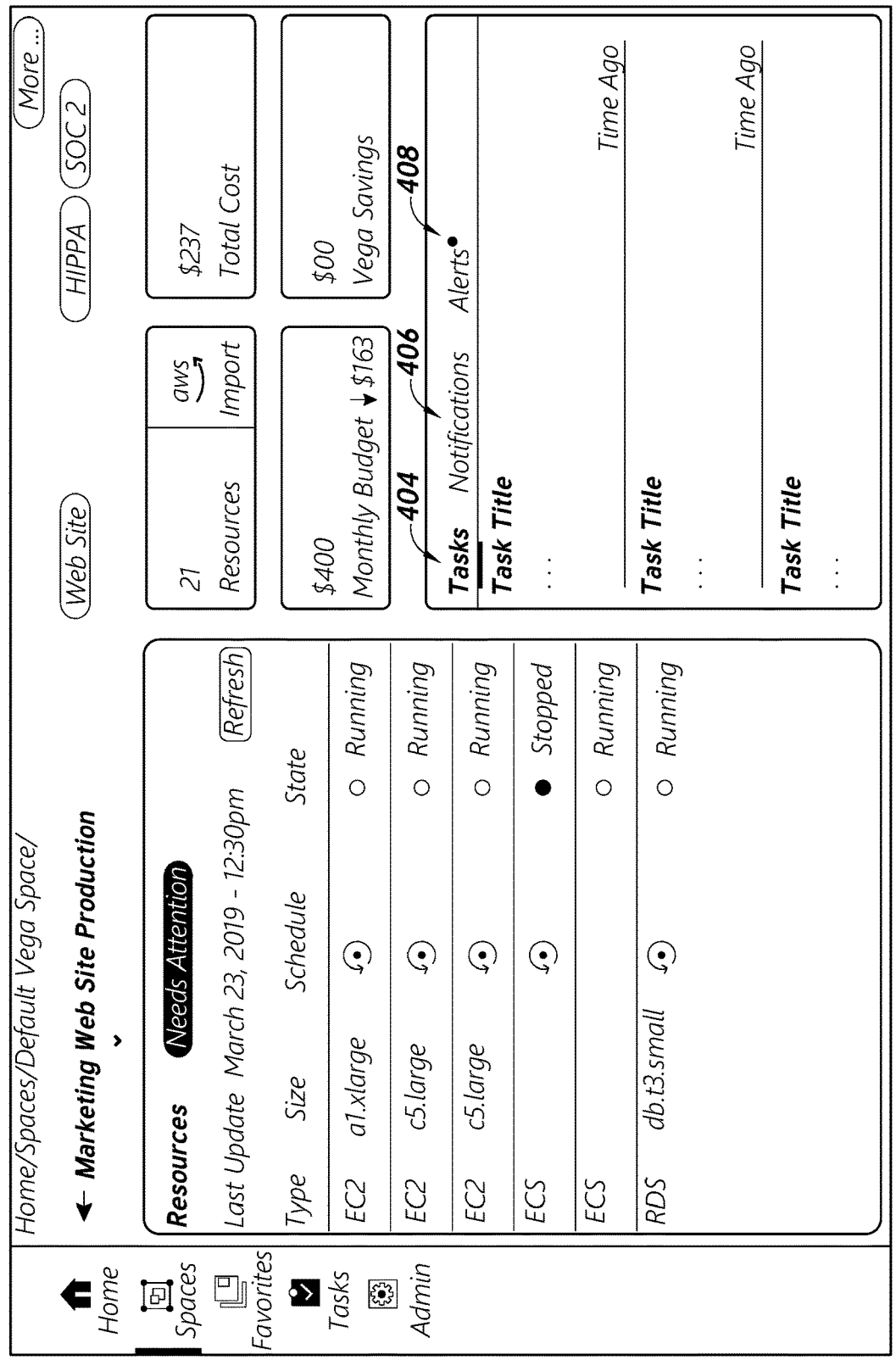
FIG. 4 illustrates an example user interface to provide information regarding computing resources associated with a workload in accordance with one or more embodiments.

FIG. 4 illustrates a user interface 400 showing information regarding computing resources (e.g., VM instances 402) implemented for a particular workload (i.e., the "Marketing Web Site Production" workload). In some examples, the interface 400 may be displayed in response to selecting the user interface element associated with the first workload 302(1) in FIG. 3 (i.e., the "Marketing Web Site Production" workload). However, the user interface 400 may be presented in other contexts. In some instances, the management service 102 may import instances or indications of the VM instances to allow the user to manage the VM instances and/or workloads from the user interface 400 (and via the management service 102). For example, users may supply an account number associated with the service provider network(s), permitting the management service 102 to access the account of the user and discover the VM instances and the characteristics of the VM instances. Users may refresh the user interface 400 to display the most recent data or characteristics associated with the VM instances. That is, to maintain up to date information, the management service 102 may continuously poll the service provider networks to determine whether the VM instance and/or the workload has undergone a change (e.g., update, software change, traffic change, etc.). In other words, the management service 102 may discover and pull resources of the service provider networks to run the account (or VM instances) of the user via the management service 102.

The user interface 400 may display information about the VM instances such as, for example, a name of the VM instance, a type of VM instance, an indication of the status of the VM instance, an indication of the service provider network of the VM instance, and so forth. In some instances, the user may be able to select the VM instances to find out more information (e.g., a utilization) about the VM instance, a resource type, compute instance, database instance, and so forth.

A tasks tab 404 may provide information regarding tasks that are to be completed by a user, such as an administrator or other user managing the "Marketing Web Site Production" space. For example, a user may view information regarding a task that is associated with a workflow for an action and/or another type of task associated with the space. The workflow may be implemented to perform an action for the space. A notifications tab 406 may provide information regarding notifications associated with the space. An alerts tab 408 may indicate recommendations or actions to perform to optimize the workload, computing resources, and/or address health concerns or issues of the workload. For example, the recommendations may include a recommendation that a new VM instance be used to optimize the workload. In such instances, the user may select one or more recommendations. Upon selecting the recommendation(s), an indication of such may be sent from the user device, or the management service 102, over the network(s) 126, to the service provider networks 106(1)-106(N) to indicate that the user is requesting an action associated with their workload and/or VM instance. Accordingly, through the user interfaces 200, 300, and 400, users may be provided dashboards and have the ability to drill into spaces, workload(s), or VM instance(s) (e.g., computing resources).

Figures 1, 5:
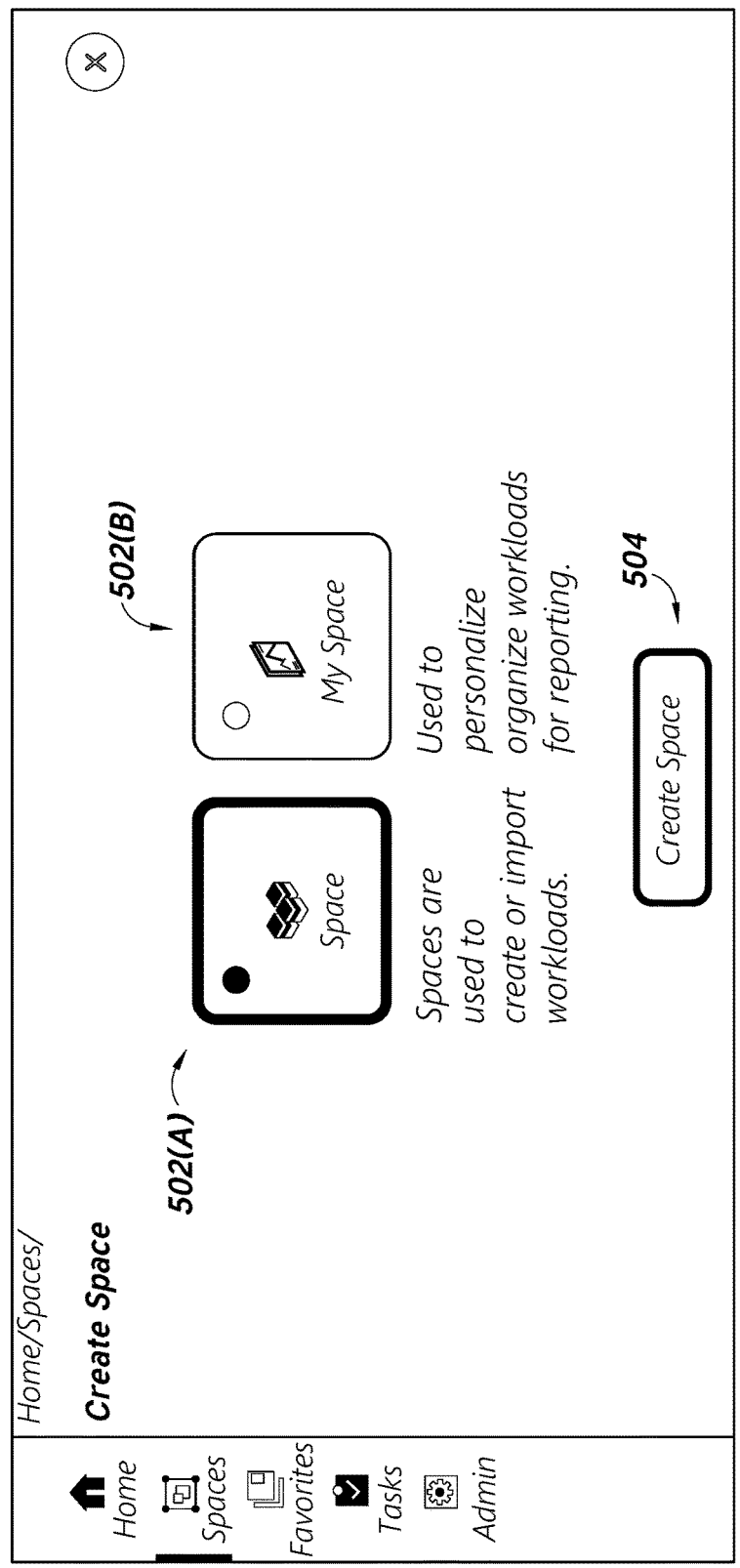
Figures 2, 5:
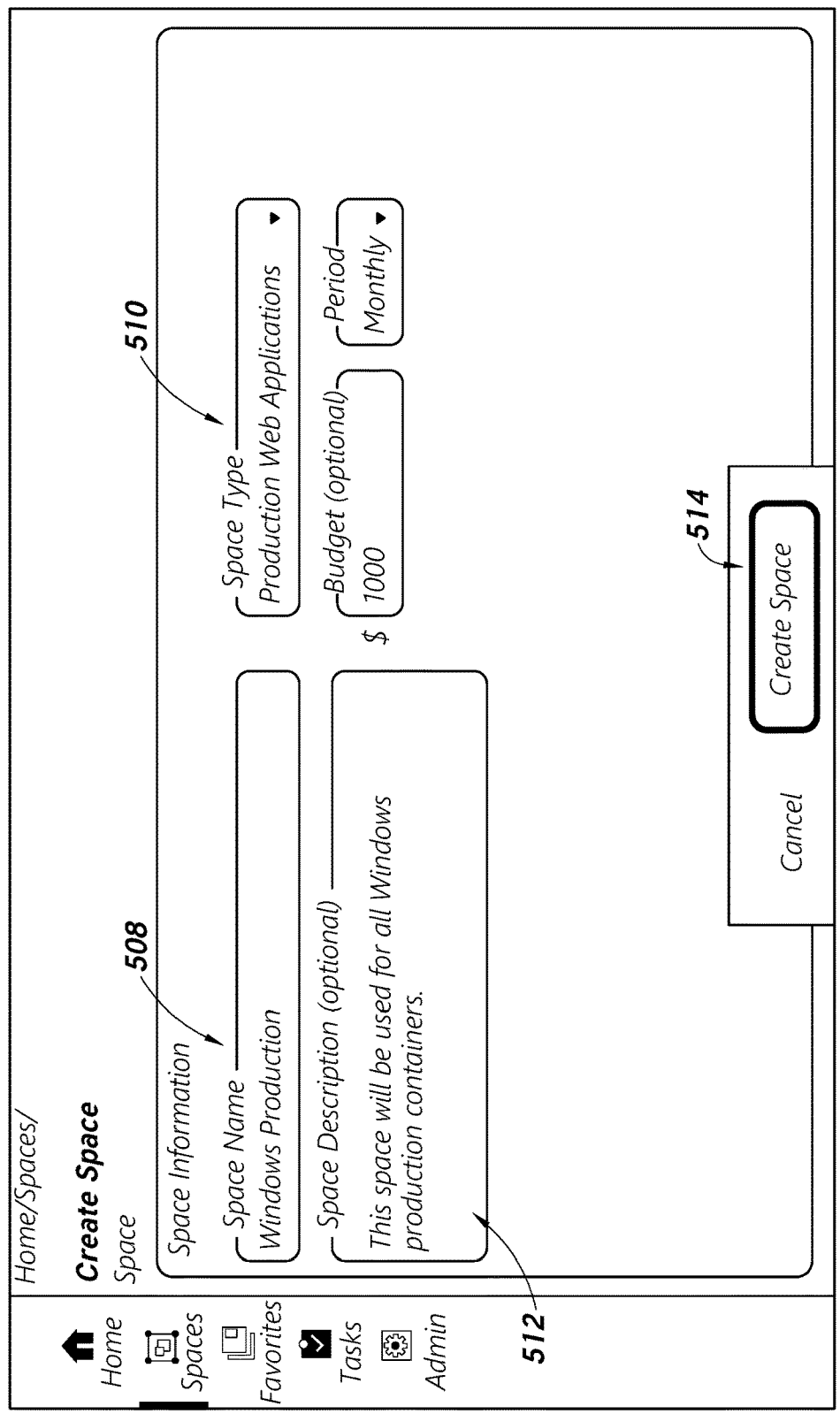
Figures 3, 5:
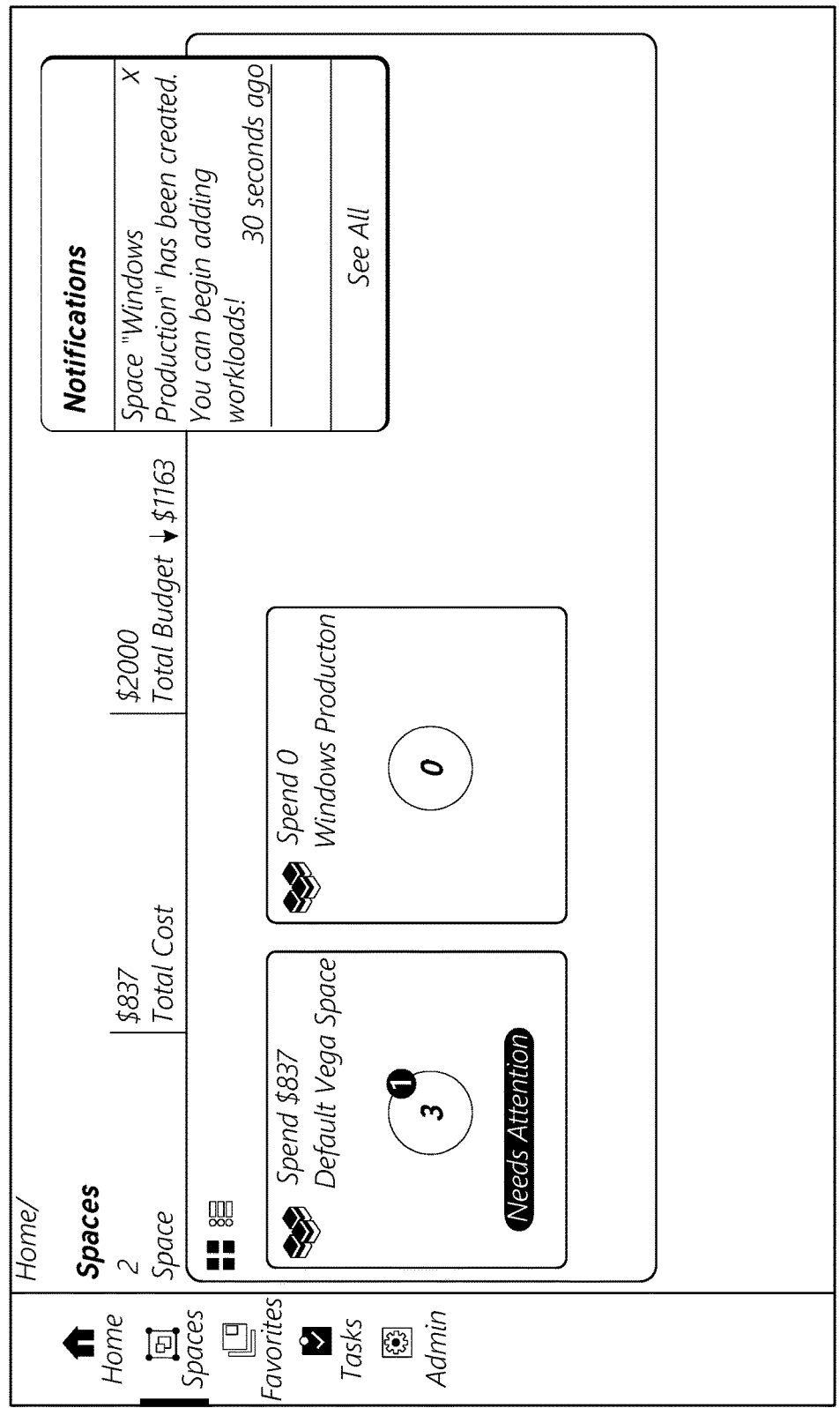

FIG. 5-1 illustrates an example user interface 500 to facilitate creation of a new space. In some instances, the user may select a button 502(A) or 502(B) in the user interface 500 to designate a type of space to create. Selecting the button 502(A) may designate a normal/default space to be created, which may make the space and/or associated workloads available to multiple/all users. Selecting the button 505(B) may designate a personalized space to be created, which may make the space and/or associated workloads available to a specific user/set of users, wherein the workloads may have a different organization than a normal/default space. The user may also select a button 504 to facilitate creation of a space for organizing, creating, and/or importing workloads associated with service provider networks. The user may import an existing workload into a space, cause a new workload to be created and associated with a space (e.g., instruct the management service 102 to create a workload for the space, create a workload independently of the management service 102, etc.), and/or otherwise create/associate a workload with a space.

FIG. 5-2 illustrates the user interface 506 to provide information to create a space. In some examples, the user interface 506 may be displayed in response to selection of the button 504 in the interface 500. However, the user interface 506 may be displayed in other contexts. As shown, the user interface 506 may include a name field 508 through which the user may provide information or other unique identifier for the space. In this case, the name field 508 indicates that the name is "Windows Production," which may be any terminology to identify the space. Additionally, the user may select a space type 510 and/or enter space description 512. Within the space description 512 the user may provide a brief description of the space and/or its intended purpose. Discussed previously, in some instances, the space description 512/space name 508 may assist the user in recognizing the space among a plurality of other spaces on their dashboard.

When creating the space, users may define a budget, and the management service 102 may monitor the usage of the VM instances in accordance with the budget. The budget may be used by the management service 102 to forecast budgeting and costs associated with the computing resources. For example, the management service 102 may provide alerts or notifications that the user may go over their budget.

Users may also define a security protocol associated with the space, whereby the management service 102 may monitor the workloads to determine whether the workloads are in compliance with the security protocol.

FIG. 5-3 illustrates an example user interface 516 that displays a list of spaces associated with a user account, such as the newly created space (i.e., "Windows Production"). In some examples, the user interface 516 is provided in response to selection of a button 514 in the user interface 506 of FIG. 5-2. However, the user interface 516 may be displayed in other contexts. The user interface 516 may display an indicator for the newly created space (i.e., "Windows Production"), as well as an indicator for an existing space (i.e., "Default Vega Space"). The user interface 516 may provide information regarding one or more spaces that are being managed by the management service 102, such as spaces associated with a particular entity (e.g., company, organization, etc.). The user may add any number of existing/new workloads to the spaces.

Figures 1, 6:
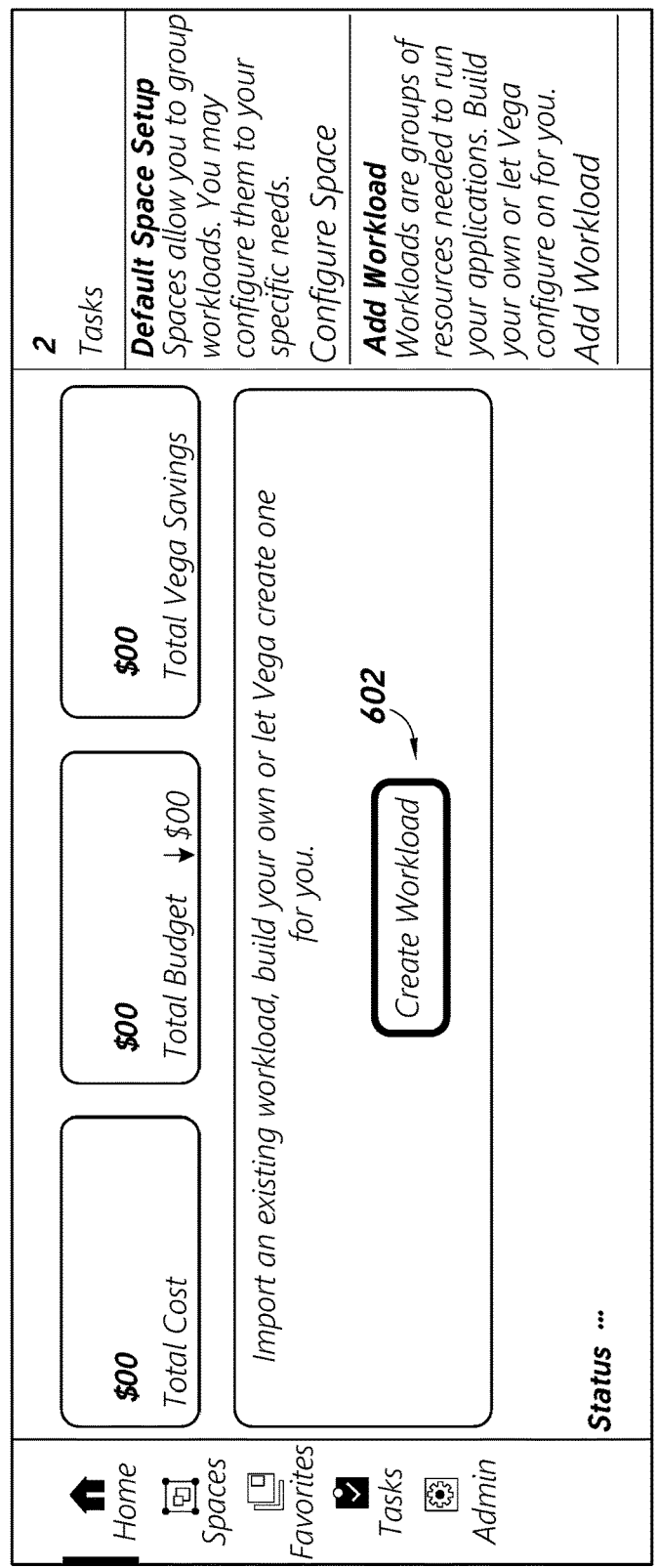
Figures 2, 6:
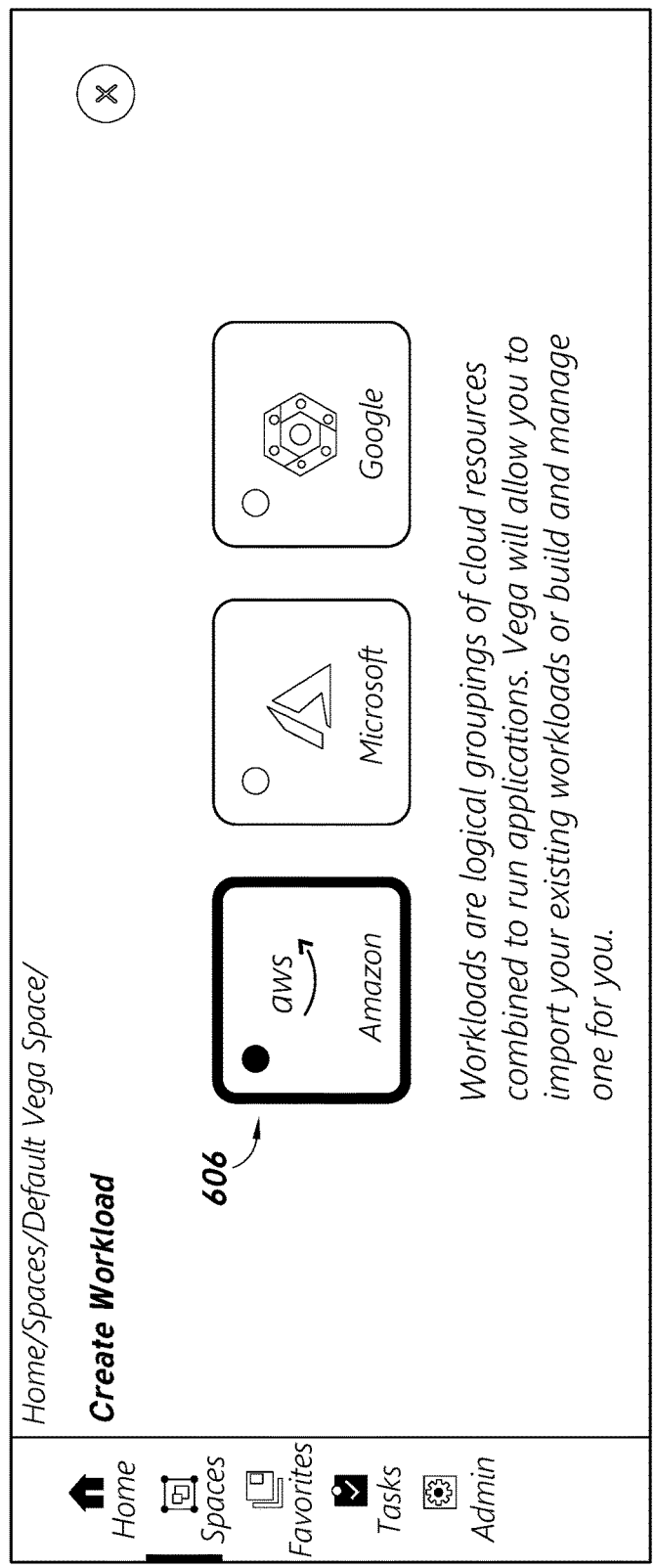
Figures 3, 6:
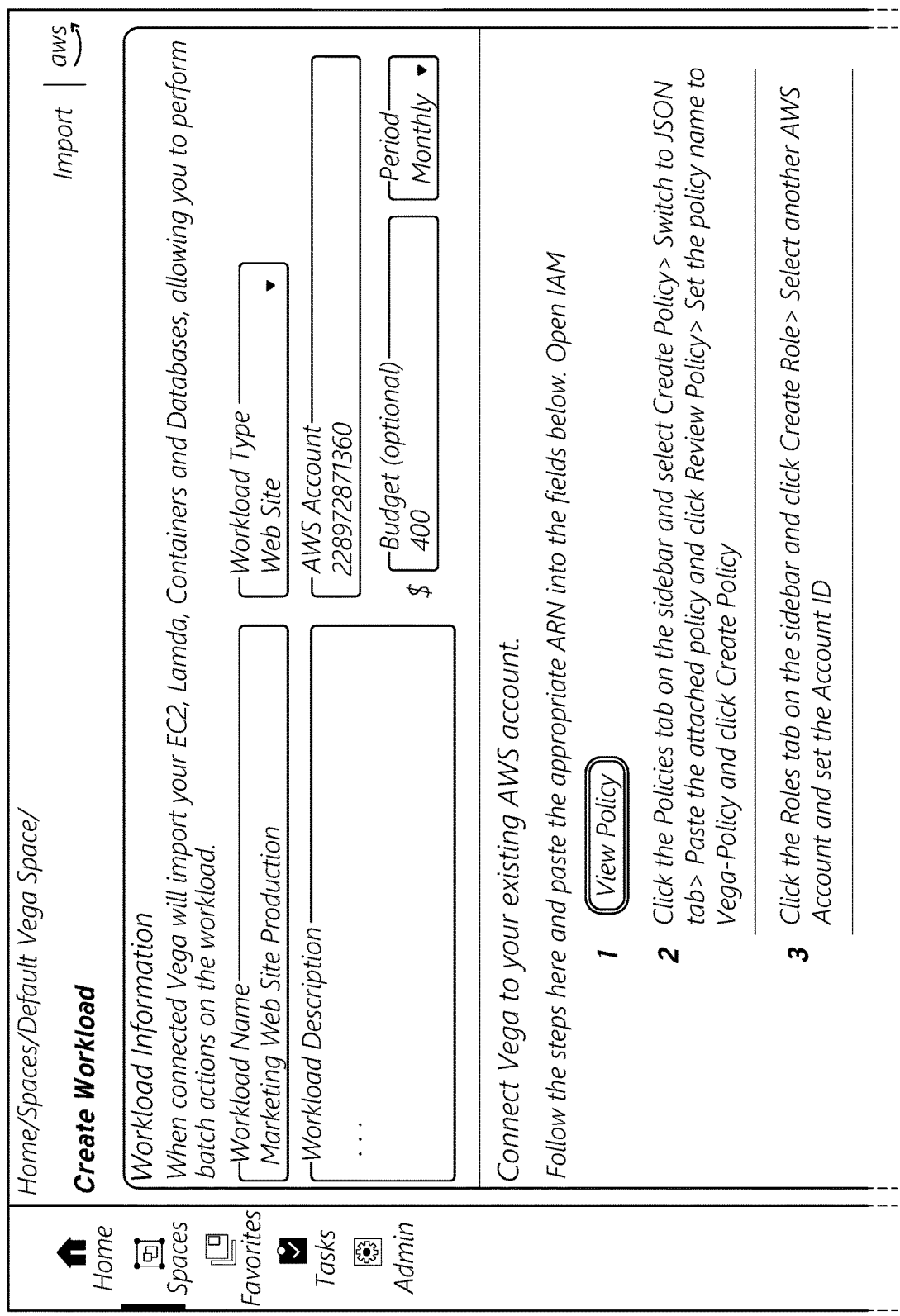
Figures 3, 6:
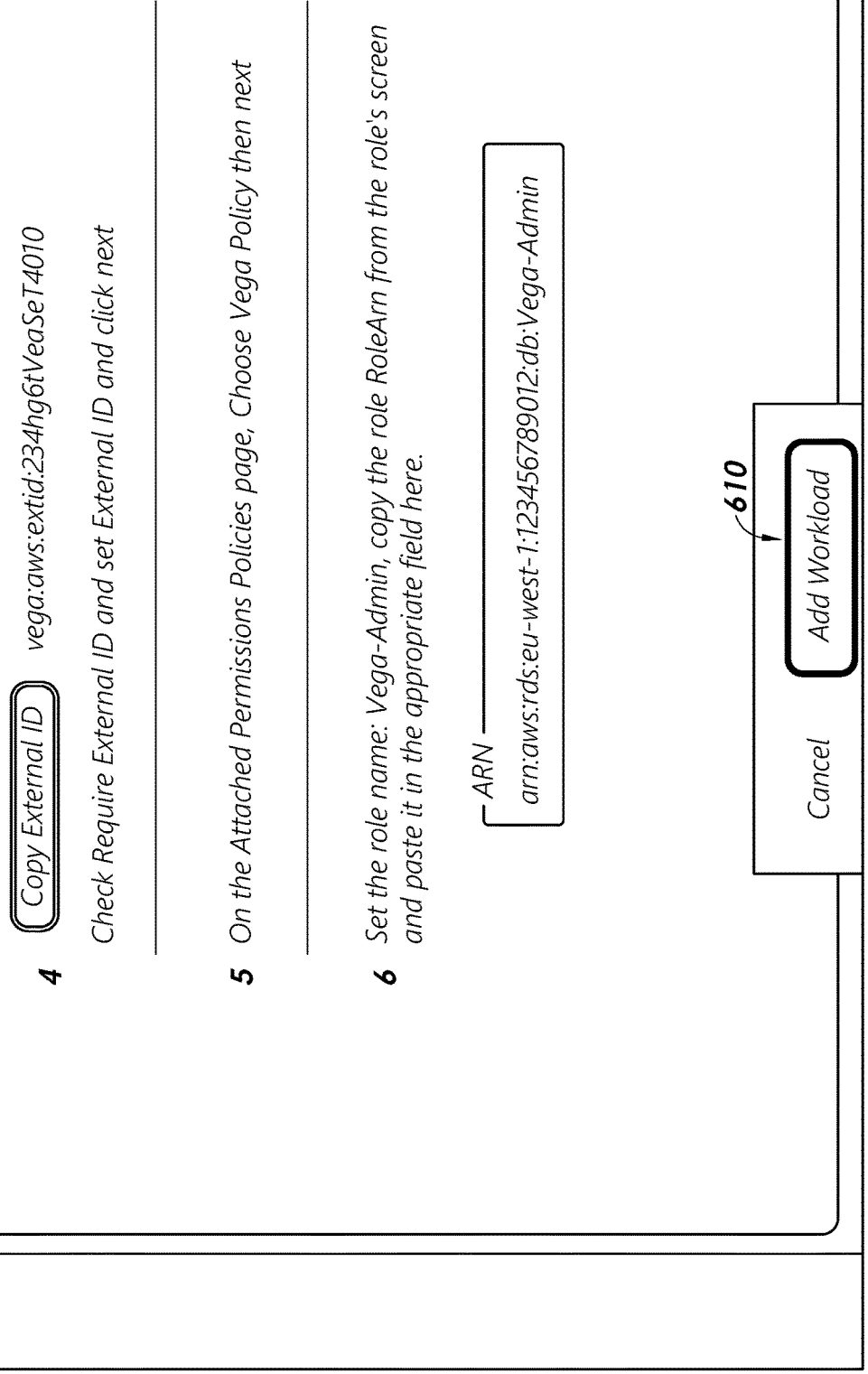

FIGS. 6-1 through 6-3 illustrate user interfaces 600, 604, 608 through which a user may create a new workload, import an existing workload into a space/account of the management service 102, and/or request that the a new workload being created by the management service 102. The management service 102 may deliver a step-by-step process that presents the user interfaces 600, 604, 608 for receiving input data that defines/identifies the workload. In some examples, the user may indicate a type of computing resource(s) as well as a service provider network for which the computing resource is being defined/identified.

As shown in FIG. 6-1, the user interface 600 may present information to create a workload and/or associate the workload with a space. The user may import an existing workload from a service provider (e.g., provide login credentials or other authentication data to authenticate/login to the service provider and obtain workload information regarding a workload implemented by the service provider). Additionally, or alternatively, the user may create/build a workload (e.g., provide relatively detailed information to configure/provision a computing resource(s) of a service provider to implement a workload). Further, the user may provide input to enable the management service 102 to create/build a workload (e.g., provide relatively high level information to cause the management service 102 to perform the processing needed to configure/provision a computing resource(s) to implement a workload).

FIG. 6-2 illustrates the example user interface 604 to enable creation/association of a workload with a space. In some examples, the user interface 604 is displayed upon the user navigating to the "Default Vega Space" and selecting a button to create a workload, such as a button 602 in the user interface 600. However, the user interface 604 may be displayed in other contexts. In examples, creating a workload within a space associates the workload with the space. For example, the user may navigate to the "Default Vega Space" and then create a workload within that space to associate the workload with that space. Through the user interface 600, the user may designate a service provider for a workload. In this example, the user selects a button 606 to designate Amazon Web Services® for the workload, such as to import, create, and/or request the management service 102 to create a workload from/within the Amazon Web Services® cloud platform.

FIG. 6-3 illustrates the example user interface 608 to provide information to create/import/request creation of a workload. In some examples, the user interface 608 is displayed in response to selection of the button 606 in the user interface 604. However, the user interface 608 may be displayed in other contexts. The user interface 608 may request information for the workload. In some instances, the information may be used by the management service 102 to import workloads, VM instances, and/or other information associated with the user from the service providers and/or the service provider networks. For example, the user may provide identifying information about a service provider/workload/computing resource to connect/link the management service 102 to the service provider/workload/computing resource (e.g., to an account of the service provider). In examples, the management service 102 may call one or more APIs of the service provider to collect information regarding a workload/computing resource implemented by the service provider. As shown, the user interface 608 may present interface elements to define a workload name, a workload and/or resource type, description, account number, login credentials, a service provider/service provider network, budget, and so forth. Such information may also include credentials/account information/authentication information, which may permit/enable the management service 102 to contact, mine, and/or obtain data from the service provider network(s). In some instances, in response to selecting a button 610, the workload may be created and/or associated with a space/account of the management service 102.

In some embodiments, to create/define a workload, a user may designate a computing resource(s) for the workload. For example, the management service 102 may obtain information from a service provider regarding computing resources that are associated with a user account. The management service 102 may use such information to display a user interface with a list of computing resources that are being implemented by the service provider. The user may select one or more of the computing resources in the list and provide information to associate with a workload (e.g., workload name, workload type, workload description, budget, etc.). Based on such selection and information, the management service 102 may designate the selected computing resource(s) as associated with the workload.

Figures 2, 7:
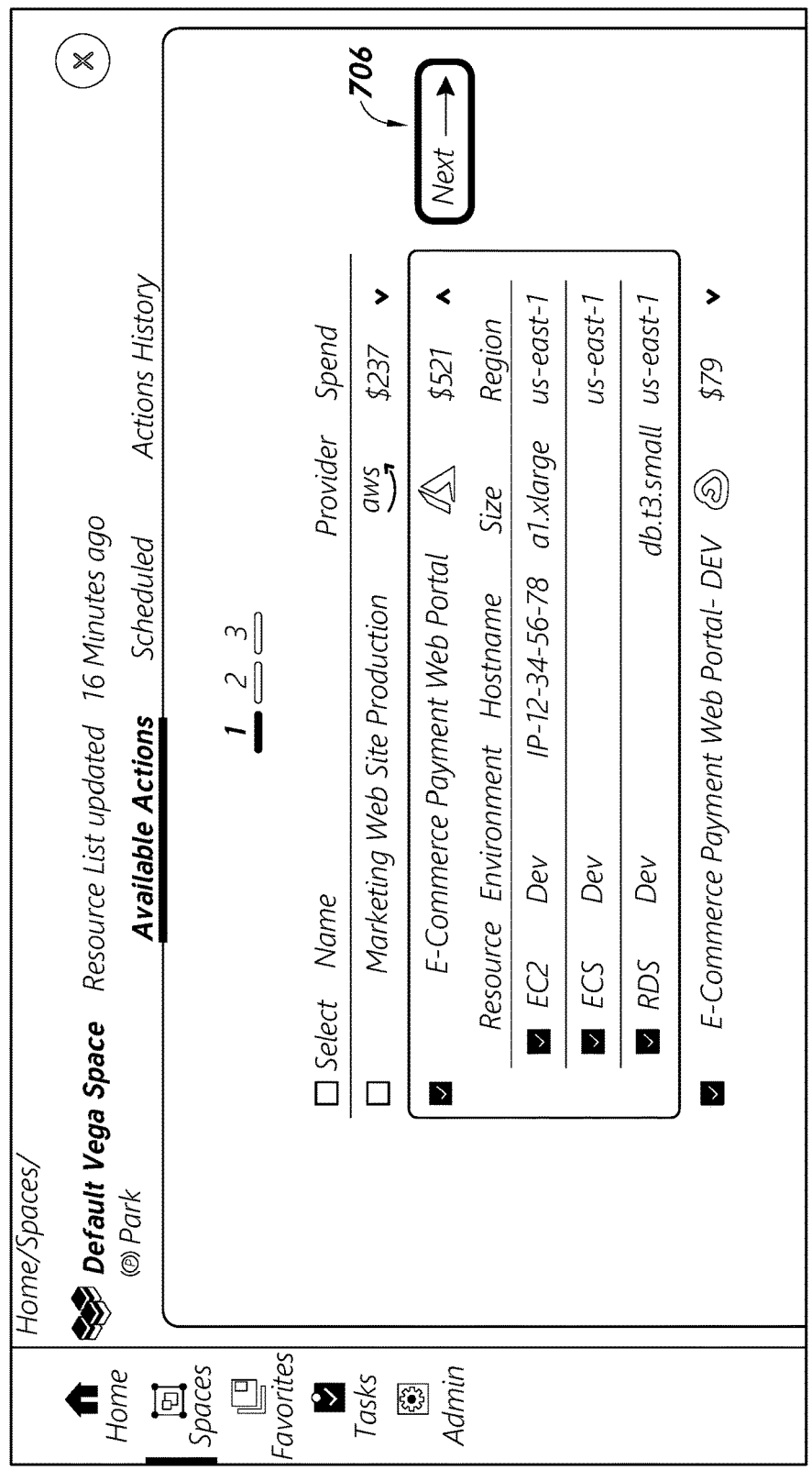
Figures 3, 7:
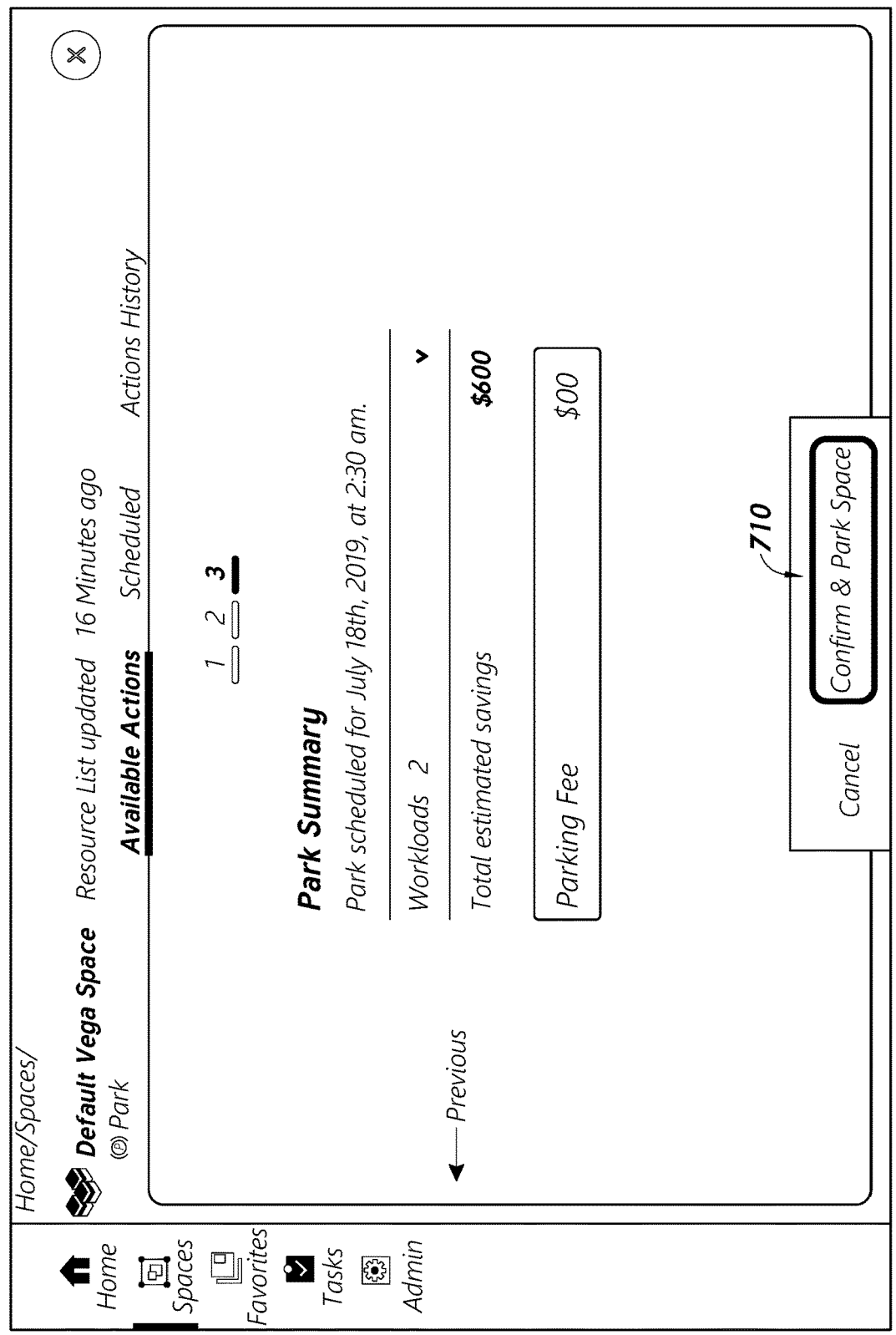

FIGS. 7-1 through 7-3 illustrates user interfaces 700, 704, 708 for causing an action to be performed on a workload(s). In some instances, the action may be performed across some or all of the workloads within a space. In some instances, the user may choose to perform the action and/or the management service 102 may recommend the action to save costs, conserve resources, backup data, achieve certain security standards, optimize workload(s)/computing resource(s), etc. The example discussed in regard to FIGS. 7-1 through 7-3 relate to a park action, however, other actions may be performed, as discussed previously.

In one illustration, a user may select a button 702 in the user interface 700 of FIG. 7-1 to initiate a park action for a space and/or workload associated with the space (e.g., the "Default Vega Space," one or more computing resources for the space, etc.). In response, the user interface 704 may be displayed to provide input regarding the park action, as shown in FIG. 7-2. For example, the optimization component 146 may determine that a workload is being underutilized, such as during 7 p.m. and 7 a.m. of all days of the week or during certain days of the week. For instance, to reduce costs/conserve resources, the optimization component 146 may determine a recommendation to park (or pause) a computing resource/space associated with a workload (e.g., VM instances used in the "E-Commerce Payment Web Portal" production space and VM instances used in the "E-Commerce Payment Web Portal-DEV" development space). In this example, the user interface 704 (and/or the user interface 700/708) may provide the recommendation to park (or perform another action) the computing resources/spaces by displaying indicators for the computing resources/space in a selected form, as shown in FIG. 7-2. The user may deselect any of the computing resources/spaces and/or confirm the automatic selection. The user may select a button 706 to navigate to a user interface (not illustrated) to view a recommended schedule (e.g., determined by the management service 102), modify the recommended schedule, and/or configure a schedule for the parking action (e.g., user defined). Upon confirming/configuring a schedule, the user interface 708 may be displayed to confirm the parking action, as shown in FIG. 7-3. A park/pause action may cause a computing resource/workload to be made inactive (e.g., not used, placed in a low consumption state, etc.).

In another illustration, a user may select the button 702 in the user interface 700 of FIG. 7-1 to initiate a park action for a space and/or workload associated with the space. In response, the user interface 704 may be displayed to provide input regarding the park action, as shown in FIG. 7-2. In this illustration, the computing resources may not initially be selected, and the user may select the computing resource to cause such computing resources to be parked (e.g., select the computing resources of the "E-Commerce Payment Web Portal" production space and the "E-Commerce Payment Web Portal-DEV" development space). Once the desired computing resources/spaces are selected, the user may select the button 706 to navigate to a user interface (not illustrated) to view a recommended schedule (e.g., determined by the management service 102), modify the recommended schedule, and/or configure a schedule for the parking action (e.g., user defined). In some instances, the user interface 704 and/or the scheduling user interface may display a graph or other information regarding usage of the computing resources overtime to assist the user in determining which computing resources to park and/or when to park a computing resource. Upon confirming/configuring a schedule, the user interface 708 may be displayed to confirm the parking action, as shown in FIG. 7-3. The user may select a button 710 to perform the parking action.

As noted above, in some instances, a park action may pause or park a computing resource (e.g., VM instances) according to a particular schedule. For example, based on the analysis of the workload analysis component 144 and/or optimization component 146, the management service 102 may determine that stopping a development or production VM instance during non-business hours may lead to increased or optimized savings, since the development or production VM instance may not generally be used during the non-business hours (e.g., used below a threshold). Accordingly, the management service 102 may provide a recommendation to stop VM instances used in development or production during hours when these VM instances are not in use, and then starting them again when their capacity is needed. The action component 154 may cause the action, and its associated workflow, to be performed. Further, in some embodiments, a user may define a schedule and/or modify a schedule recommended by the management service 102. Further, users may choose to park certain computing resources within the space.

In some embodiments, any of the user interfaces 700, 704, 708 (and/or other interfaces) may provide costs savings associated with a parking action. In some instances, the cost savings may be displayed before the park action is implemented (such as that illustrated in FIG. 7-3), which may provide users with visibility into costs. For example, the management service 102 may provide a cost estimation prior to parking VM instances. In some instances, the management service 102 may charge fees associated with performing the actions, which may be displayed in the user interface 708 as shown in FIG. 7-3, for example. In some instances, the fees charged by the management service 102 may be a flat fee, based on the amount of savings caused by performing the action (e.g., a percentage of the savings), etc. Accordingly, the management service 102 may provide in application purchases based on the actions performed by the user.

In some embodiments, users may perform an action(s) across service providers networks. For example, users may perform centralized commands on workloads and/or computing resources (e.g., VM instances) within spaces, which may be associated with different service providers. In doing so, the management service 102 may provide a certain workflow associated with the actions for the service provider networks 106(1)-106(N). For example, the user may park a VM instance for a first service provider network and may park a VM instance for a second service provider network using the same or different workflows. Each workflow may be associated with one or more tasks and/or a specific order of performing the one or more tasks. Each task may be performed by a computing system/device and/or a user. For example, to perform a parking action for a space associated with a production workload(s) (e.g., running an e-commerce website), the management service 102 may determine/reference a workflow that is specific to the parking action. The workflow may include placing computing resources in an inactive state in a particular manner, backing up data at particular times while performing the parking action, notifying users to perform particular manual tasks, waiting for users to perform manual tasks (e.g., before moving onto other tasks), and so on. In many instances, a workflow is determined by the management service 102 (e.g., the management service 102 determines the tasks for the workflow, an order of implementing the tasks, etc.). However, a workflow may be determined by another system/user, such as a service provider, end-user, etc. In some instances, different workflows are performed for different service providers/computing resources.

Figure 8:
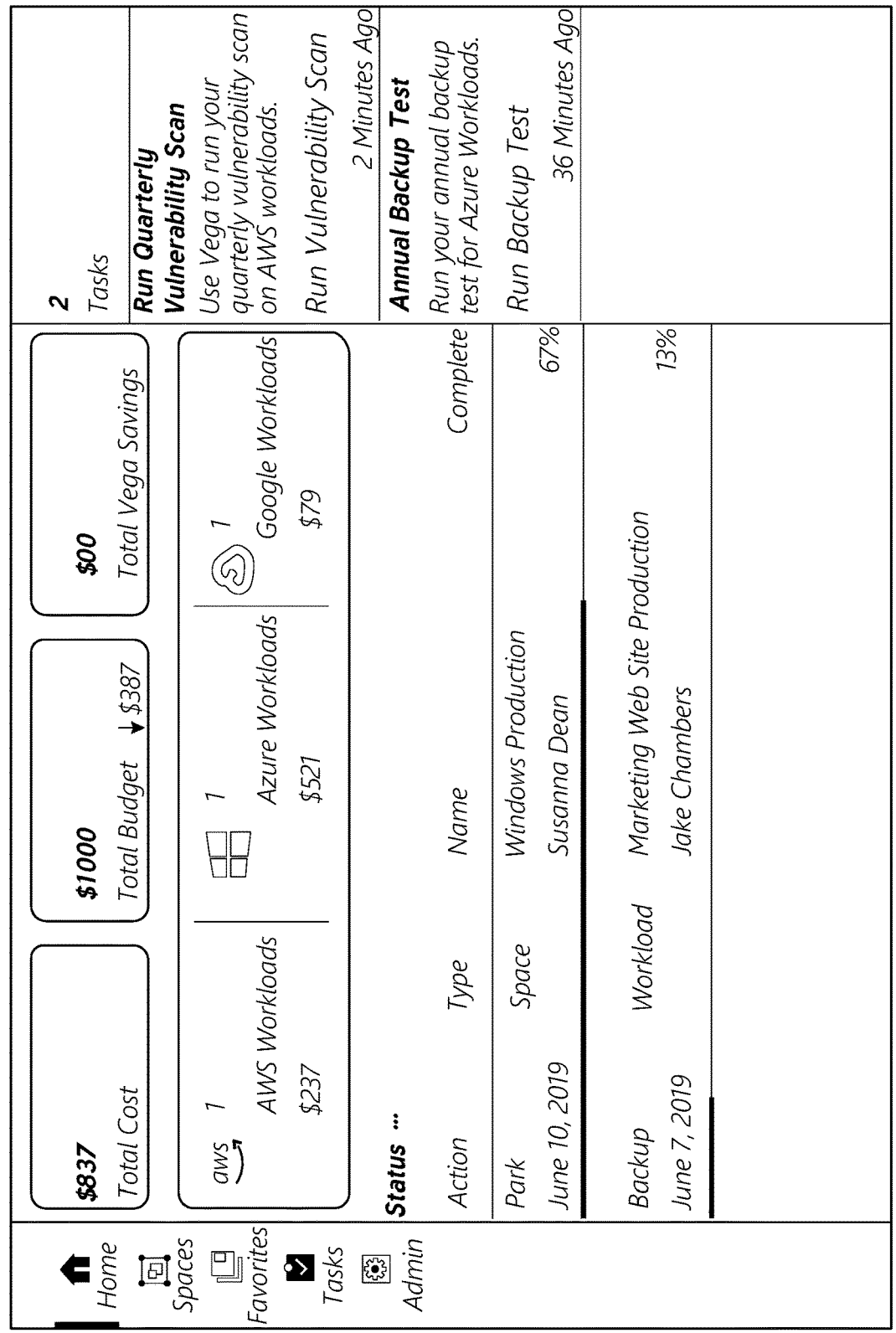
FIG. 8 illustrates an example user interface to provide information regarding actions being performed on spaces and/or workloads in accordance with one or more embodiments.

FIG. 8 illustrates an example user interface 800 showing information regarding actions being performed on spaces and/or workloads. As illustrated, the user interface 800 may provide the user with a consolidated monitoring view to track the progress of the actions. For example, the user interface 800 illustrates that a park action is being performed on a space and a backup action is being performed on a workload. That is, as noted above, the user may cause an action to be performed on a space (and/or workloads within the space) and/or may perform actions on particular workloads. The user interface 800 also illustrates the progress, or completion of each action being performed. Although FIG. 8 illustrates particular actions being performed, it is to be understood that the different actions may be performed in parallel, or consecutively, other than those illustrated.

Figure 9:
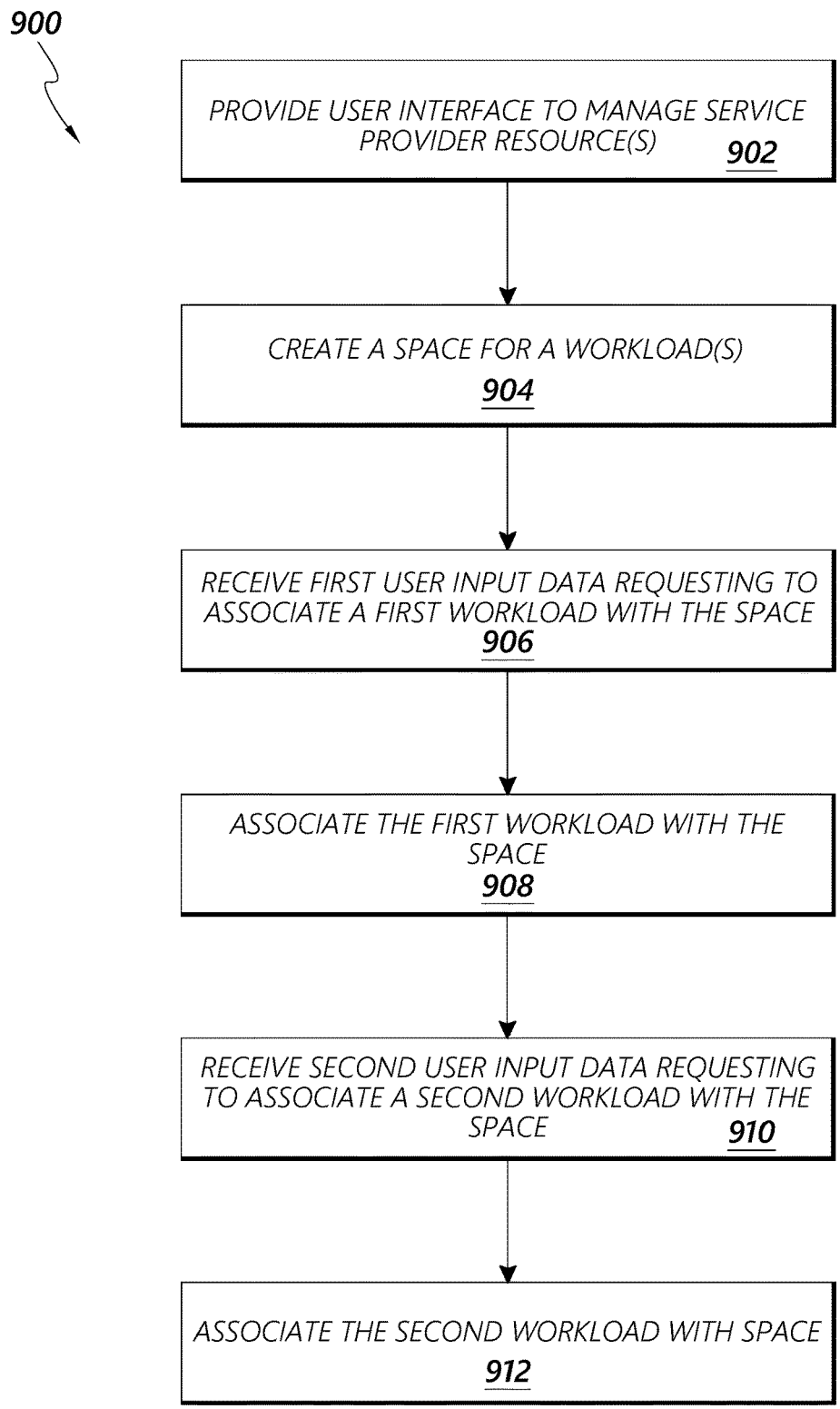
FIG. 9 illustrates an example flow diagram of a process for creating a space and associating a workload(s) with the space in accordance with one or more embodiments.

FIG. 9 illustrates an example process 900 for organizing workloads in a space. One or more of the individual operations of the process 900 may be performed by any of the systems/devices discussed herein, such as the management service 102. However, the process 900 may be performed in other architectures. Moreover, the architecture 100 may be used to perform other processes.

The process 900 (as well as each process described herein) is illustrated as a logical flow graph, each graph of which represents a sequence of operations that can be implemented in hardware, software, or a combination thereof. In the context of software, the operations represent computer-executable instructions stored on one or more computer-readable media that, when executed by one or more processors (and/or hardware logic components), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

At 902, the process 900 may include providing a user interface to manage a service provider resource(s), such as cloud computing resources and/or any other type of resource. The user interface may display information regarding an existing space(s) to manage a service provider resource(s), information to create a new space, information regarding a workload(s) associated with a space, information regarding a computing resource(s) associated with a space, and so on. In some instances, a user may navigate within the user interface (and/or from the user interface to other user interfaces/screens) to view the information. In some instances, the user interface may display information indicating a budget (e.g., for a space/workload), information indicating an amount spent for a space/workload/computing resource, information indicating usage of computing resources/workloads (e.g., graphs indicating times when computing resources are used the most/least), information indicating a region(s)/zone(s) associated with a computing resource, and so on. In some embodiments, an amount spent for a space/workload/computing resource may be tracked overtime and/or the user interface may display information indicating a current amount spent.

At 904, the process 900 may include creating a space for a workload(s). For example, the management service 102 may create a logical container, data structure, etc. to group data associated with a workload(s), which may form the space for the workload(s). In some examples, user may provide input (e.g., user input data) via the user interface requesting to create a space to manage a workload(s) and/or input indicating information/parameters to associate with the space, such as a name for the space, type of space, description of the space, budget for the space, etc. Based on the input/information/parameters, the management service 102 may associate the space with such input/information/parameters. As such, the user may define a space managed by the management service 102 to organize one or more workloads.

At 906, the process 900 may include receiving first user input data requesting to associate/organize a first workload with the space. For example, the management service 102 may receive, such as from a user via a user interface, an indication to import an existing workload into the space, an indication to create a new workload and then associate the new workload with the space, an indication to associate a workload with another workload, and so on. The first user input data may include an identifier of the first workload, a name of a service provider that provisions computing resources associated with the first workload, and/or may provide credentials or other verifications to access or discover computing resources within the service provider network (e.g., for the management service 102 to identify/obtain such information). The first workload may be associated/implemented by a first service provider (e.g., a first cloud computing service of a first entity).

At 908, the process 900 may include associating the first workload with the space (e.g., importing the first workload into the space). For example, the management service 102 may transmit a request to a service provider network/service provider associated with the first workload to obtain data associated with the first workload, such as data indicating characteristics of the first workload and/or computing resources associated with the first workload. The management service 102 may receive data associated with the first workload, such as data related to a provisioned computing resource(s) (e.g., VM instances), a cost for running or provisioning the computing resource(s), and/or other data indicating characteristics associated with a health, utilization, security, backup, and so forth of the computing resource(s). The management service 102 may import the received data associated with the first workload into the space to allow the user to manage the first workload via the management service 102. In some instances, the received data may assist the management service 102 in assessing a health of the first workload and/or an optimization of the first workload, for example. In some instances, the management service 102 and the service provider networks 106(1)-106(N) may be in communication to continuously receive and/or transmit data associated with the first workload and/or the computing resources. That is, the management service 102 may receive up to date information about the imported first workload for use by the user to manage the first workload.

In some embodiments, such as when the first user input data includes a request to create a new workload, the process 900 may include creating the new workload (i.e., the first workload). For example, one or more computing resources may be provisioned on a service provider to implement the new workload. Such provisioning may occur with user assistance (e.g., the user providing input to configure a computing resource(s)) or without user assistance/relatively minor user assistance (e.g., the user provides a request and relatively high-level information for the management service 102 to provision a computing resource(s) to implement a workload).

At 910, the process 900 may include receiving second user input data requesting to associate/organize a second workload with the space. For example, a user may provide, such as via a user interface, an indication to import an existing workload into the space, an indication to create a new workload and then associate the new workload with the space, an indication to associate a workload with another workload, and so on. The second user input data may include an identifier of the second workload, a name of a service provider that provisions computing resources associated with the second workload, and/or may provide credentials or other verifications to access or discover computing resources within the service provider network (e.g., for the management service 102 to identify/obtain such information). The second workload may be associated/implemented by a second service provider (e.g., a second cloud computing service of a second entity), which may be different than the first service provider associated with the first workload.

In some embodiments, such as when the second user input data includes a request to create a new workload, the process 900 may include creating the new workload (i.e., the second workload). For example, one or more computing resources may be provisioned on a service provider to implement the new workload. Such provisioning may occur with user assistance (e.g., the user providing input to configure a computing resource(s)) or without user assistance/relatively minor user assistance (e.g., the user provides a request and relatively high-level information for the management service 102 to provision a computing resource(s) to implement a workload).

At 912, the process 900 may include associating the second workload with the space (e.g., importing the second workload into the space). For example, the management service 102 may transmit a request to a service provider network/service provider associated with the second workload to obtain data associated with the second workload, such as data indicating characteristics of the second workload and/or computing resources associated with the second workload. The management service 102 may receive data associated with the second workload, such as data related to a provisioned computing resource(s) (e.g., VM instances), a cost for running or provisioning the computing resource(s), and/or other data indicating characteristics associated with a health, utilization, security, backup, and so forth of the computing resource(s). The management service 102 may import the received data associated with the second workload into the space to allow the user to manage the second workload via the management service 102. In some instances, the received data may assist the management service 102 in assessing a health of the second workload and/or an optimization of the second workload, for example. In some instances, the management service 102 and the service provider networks 106(1)-106(N) may be in communication to continuously receive and/or transmit data associated with the second workload and/or the computing resources. That is, the management service 102 may receive up to date information about the imported second workload for use by the user to manage the first workload.

As such, by associating the first workload and the second workload with the same space, the process 900 may include grouping the first workload and the second workload into the same group (e.g., based on a request to group/associate the first and second workloads). This may facilitate efficient management of the first and second workloads. In such instances, the first user input data and/or the second user input data may include a request to group one or more workloads/computing resources.

In some embodiments, the process 900 may present a first indication of the first workload and a second indication of the second workload in association with the space. For example, the management service 102 may display an indication (e.g., health, utilization, concerns, etc.) of the first workload and an indication (e.g., health, utilization, concerns, etc.) of the second workload within the space. In some instances, visually displaying the indications of the first workload and the second workload may assist the user in visualizing the workloads associated with the space. For example, knowing the workloads within the space may assist in the user in performing batch actions on the workloads. As discussed herein, the user may be permitted to import workloads across service provider networks for managing their workloads. Additionally, users may choose to organize workloads into spaces based on their preferences, role, which workloads the user may want to perform batch processing on, and so forth. Moreover, despite the user grouping certain workloads into spaces, such organization may not alter or change an organization or architecture of the service provider network.

Figure 10:
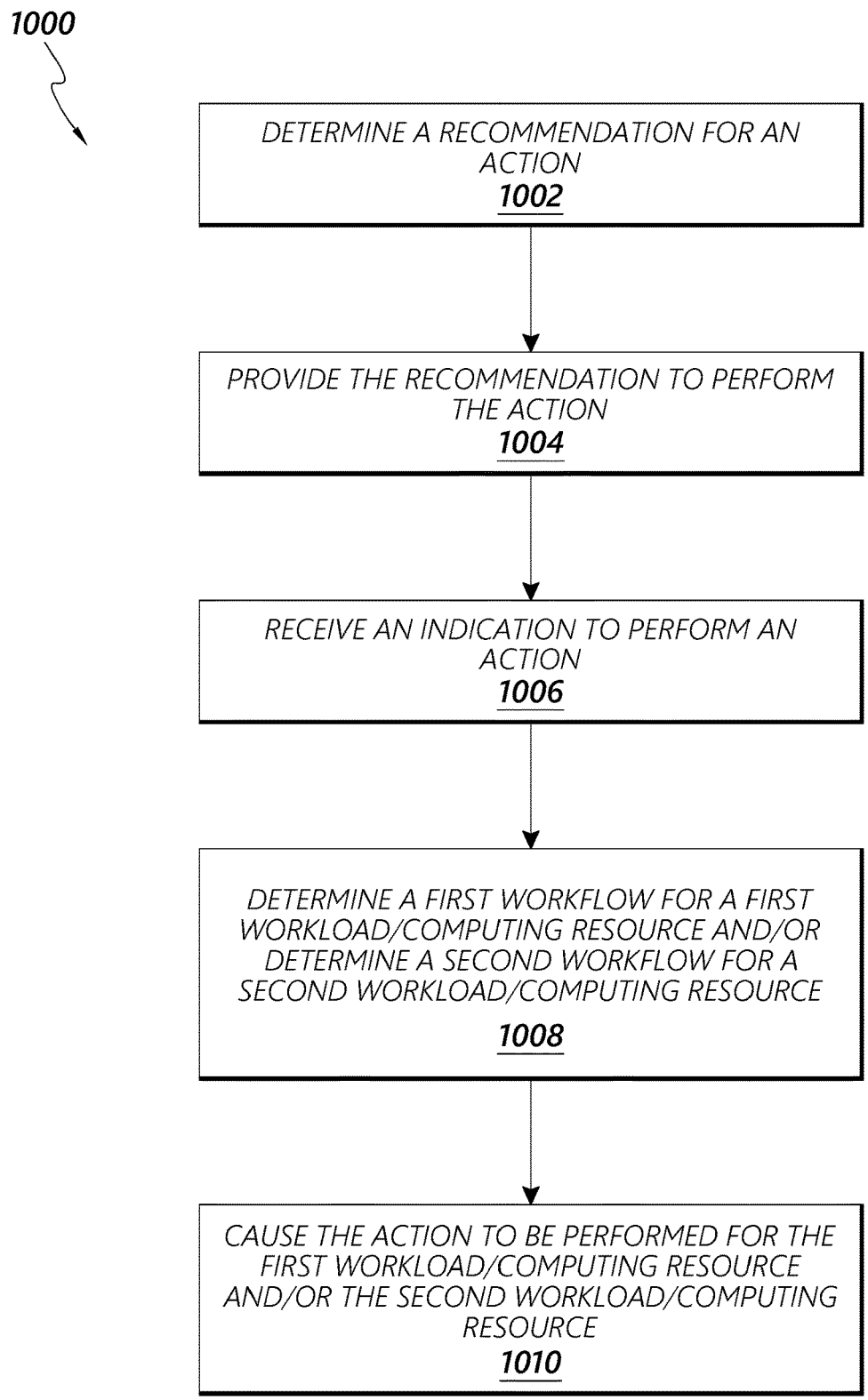
FIG. 10 illustrates an example flow diagram of a process for performing an action for a space/workload in accordance with one or more embodiments.

FIG. 10 illustrates an example process 1000 for performing an action on a space and/or workload within the space. One or more of the individual operations of the process 1000 may be performed by any of the systems/devices discussed herein, such as the management service 102. However, the process 1000 may be performed in other architectures. Moreover, the architecture 100 may be used to perform other processes. In some instances, the process 1000 may continue or proceed from the process 900 once a group of workloads is formed.

The process 1000 (as well as each process described herein) is illustrated as a logical flow graph, each graph of which represents a sequence of operations that can be implemented in hardware, software, or a combination thereof. In the context of software, the operations represent computer-executable instructions stored on one or more computer-readable media that, when executed by one or more processors (and/or hardware logic components), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

At 1002, the process 1000 may include determining a recommendation for an action. For example, the management service 102 may receive data (from a service provider) indicating a utilization of a computing resource of the service provider (e.g., a computing resource associated with a workload/space). The data may indicate how often the computing resource is used (e.g., times when the computing resource is used), how much of the computing resource is used (e.g., a percentage of use when the computing resource is running, such as 80% capacity), average/peak/low usage of the computing resource, any errors associated with implementing the computing resource, information regarding a backed up of data for the computing resource (e.g., a last time data was backed-up, whether or not a backup was completed, etc.), information regarding security metrics for the computing resource (e.g., a last time a security/malware scan was performed, results of a security/malware scan, etc.), information indicating a cost for usage of the computing resource (e.g., per unit of time, flat rate, etc.), and/or any other characteristic/performance information associated with the computing resource.

Based on such data, the management service 102 may determine an action to recommend to a user. In one example, the management service 102 may determine that the computing resource is underutilized (e.g., used less than a threshold amount) and/or underutilized during a particular period of time(s) during the week. Here, the management service 102 may determine a recommendation to park the computing resource during the period of time(s). In another examples, the management service 102 may determine that the computing resource is used above a threshold (e.g., substantially at a maximum capacity most of the time). Here, the management service 102 may determine a recommendation to provision an additional computing resource to assist in implementing a workload associated with the computing resource. A recommended action may be determined for any number of computing resources, workloads, and/or spaces.

At 1004, the process 1000 may include providing the recommendation to perform the action. For example, the management service 102 may provide the recommendation via a user interface. As noted above, the recommendation may be to perform an action for a computing resource(s), a workload(s) (e.g., computing resources associated with the workload(s)), a space(s) (e.g., computing resources/workloads associated with the space), and so on. A user may view the recommendation via the user interface. In some instances, the management service 102 may generate a visualization regarding the recommended action, such as a graph, metrics, etc.

At 1006, the process 1000 may include receiving an indication to perform an action, such as a recommended action, a user designated action, etc. The indication may be received via a user interface, client device, and/or in another manner. For example, the management service 102 may receive an indication to perform an action for a space (e.g., workloads/computing resources associated with the space), a workload (e.g., computing resources associated with the workload), a computing resource, etc. In one example, the management service 102 may receive a request to park the space or to park the workloads within the space (and/or input indicating a time period to park the space/workloads) to reduce the underutilization of the computing resources associated with the space (or workloads).

At 1008, the process 1000 may include determining a first workflow associated with performing the action for a first workload/computing resource, such as a first workload/computing resource associated with a space. For example, the management service 102 may determine characteristics of a first workload (e.g., service provider network, provisioned computing resource (or VM instances), etc.) and determine a first workflow for the first workload based on the characteristics of the first workload. For instance, the management service 102 may determine tasks for the first workflow to perform the action for the first workload. A workflow may be associated with one or more tasks, with the one or more tasks arranged in a particular order. Each task may be performed by a computing system/device and/or a user. In some instances, such as where workloads within a space are distributed across multiple service provider networks, specific tasks for performing an action may depend on the particular service provider network. In one example action of parking a first workload, the management service 102 may cause the first workload to park by implementing a particular workflow (e.g., transmitting a request to a service provider network indicating a schedule to park, receiving confirmation of park, etc.).

In some embodiments, at 1008, the process 1000 may include determining a second workflow associated with performing the action for a second workload/computing resource, such as a second workload/computing resource associated with a space. The second workload/computing resource may be associated with the same space as the first workload/computing resource. For example, the management service 102 may determine characteristics of a second workload (e.g., service provider network, provisioned computing resource (or VM instances), etc.) and determine a second workflow for the second workload based on the characteristics of the second workload. For instance, the management service 102 may determine tasks for the second workflow to perform the action for the second workload. In some instances, such as where workloads within a space are implemented across service providers networks, specific tasks for performing an action may depend on the particular service provider network.

At 1010, the process 1000 may include causing the action to be performed for the first workload/computing resource. For example, the management service 102 (e.g., the action component 154) may cause the first workflow to be performed to implement the action for the first workload. In some instances, this may include transmitting one or more messages/requests (e.g., in a particular order) to a service provider to alter a characteristic(s) of a computing resource associated with the first workload. In one example, the action comprises parking, and the first workflow includes causing the first workload/computing resource to be set to an inactive state.

In some embodiments, at 1010, the process 1000 may include causing the second workflow to be performed for the second workload/computing resource. For example, the management service 102 (e.g., the action component 154) may cause the second workflow to be performed to implement the action for the second workload. In some instances, the process 1000 may cause the first workload and the second workload to be performed in series or in parallel.

In some embodiments, the process 1000 may include presenting an indication that the action has been performed for the first workload/computing resource and/or an indication that the action has been performed for the second workload/computing resource. Accordingly, after being performed, a dashboard(s) and/or user interface(s) of the management service 102 may update to indicate that the action has been performed.

Although the process 1000 is discussed as performing a particular action, discussed above, the management service 102 may perform additional actions (and associated workflows) on workloads/computing resources within a space. For example, the management service 102 may backup the space, clone the space, provision new computing resources (e.g., VM instances), optimize, etc. In some instances, the user may choose to perform actions on the entire space, or select workloads within the space. Further, in instances where the same workload is organized into more than one space, imitating the action within a first space including the workload may cause the action to be performed on the workload within a second space.

Figure 11:
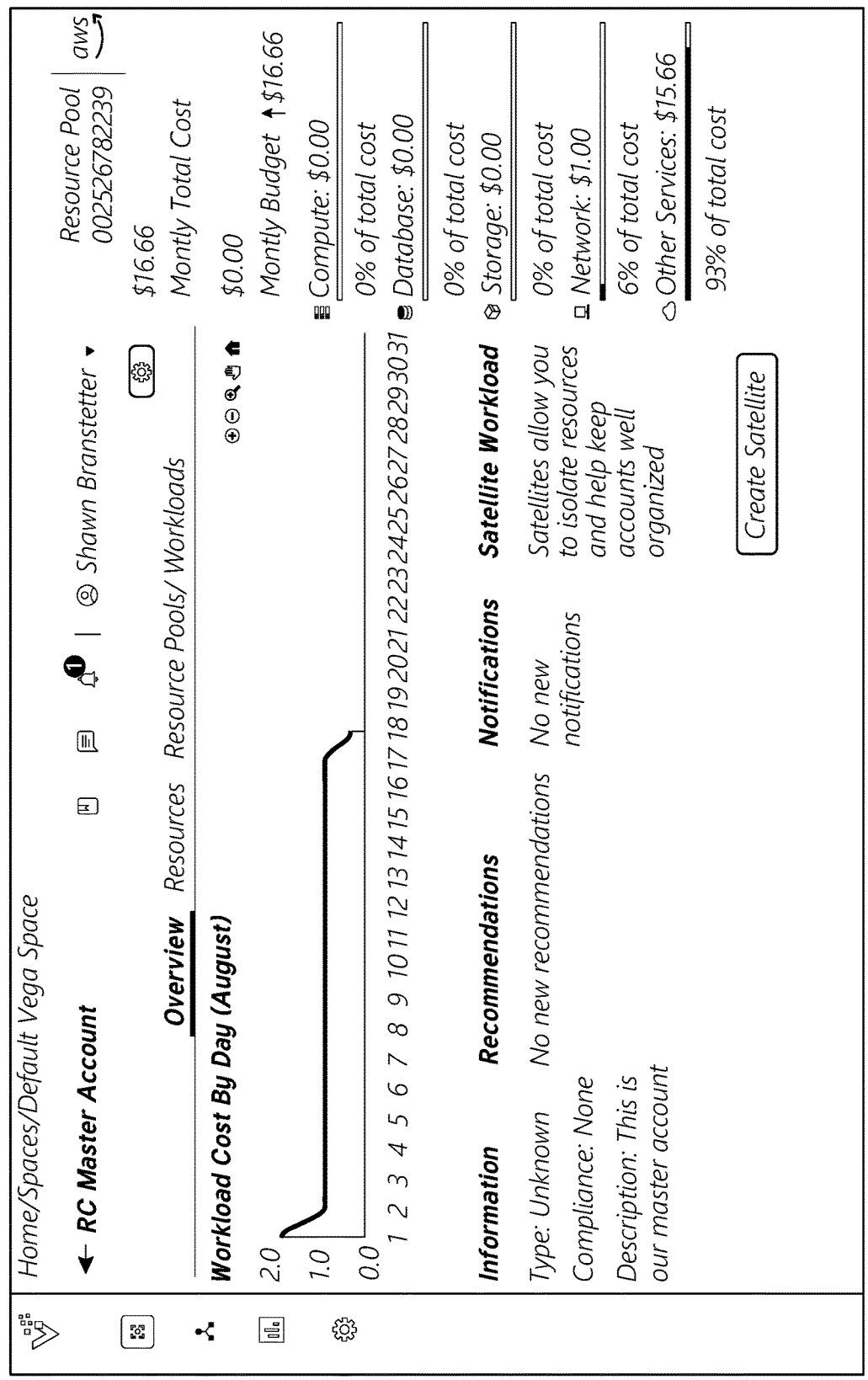
FIG. 11 illustrates an example user interface to provide information about a workload in accordance with one or more embodiments.

FIG. 11 illustrates an example user interface 1100 to provide information about a workload. In this example, the user interface 1100 may provide information regarding a workload entitled "RC Master Account." As shown, the user interface 1100 displays information in an overview tab, which may include a graph indicating a cost by day for implementing the workload (e.g., a cost over time for computing resources for the workload), information about a monthly budget/total monthly spend/category spend/etc. for the workload, information about a type/compliance/description of the workload, a recommendation for the workload (e.g., a recommended action to take), a notification regarding the workload, information about a satellite workload (e.g., information about a number of satellite workloads implemented, an indicator/interface element to create a satellite workload, etc.), and so on. In examples, satellite resources/workloads may be a subset of resources/workloads in a service provider account that are organized in a particular manner (e.g., resources/workloads a user desires to organize in a particular manner). For example, a user may have ringfenced demo resources in an account with a satellite workload. In some examples, the user interface 1100 may be presented instead of, or in addition to, the user interface 400 of FIG. 4. However, the user interface 1100 may be presented in various contexts.

In some embodiments, the management service 102 may facilitate functionality to implement/manage a resource pool. A resource pool may refer to multiple computing resources that are associated with an account to facilitate multiple workloads. For example, a service provider account may be associated multiple workloads that are implemented by some shared computing resources. An amount of money may be spent to maintain the account/computing resources. In some instances, relatively few resources are shared within an account and the rest of the resources are unique to a workload. In one illustration, a first workload and a second workload may be implemented in the same account using some of the same computing resources, creating a resource pool. In examples, it may be difficult to determine for a resource pool which resources and/or spending (e.g., money spent for the resources) are associated with which workloads. In some embodiments, satellite resources/workloads are implemented to designate which resources below to which workloads within an account. In some instances, as shown in FIG. 11, a user may manage a resource pool (e.g., in a similar manner as discussed herein to manage other workloads/computing resources, in a manner that implements satellite resources/workloads, and/or in a different manner) by selecting the "Resource Pools/Workload" tab.

FIG. 12 illustrates an example user interface 1200 to provide information about a workload. As similarly discussed above for FIG. 11, the user interface 1200 provides information regarding the workload entitled "RC Master Account." As shown, the user interface 1200 may display information in a resources tab, which may include an identifier(s) for a computing resource(s), a name of the computing resource(s), a region(s) in which the computing resource(s) is implemented (e.g., a geographical location where the computing resource(s) is implemented), a zone for the computing resource(s), a status of the computing resource(s), a type of service/cloud provider implementing the computing resource(s) (which may include a name of an entity), information about a monthly budget/total monthly spend/category spend/etc. for the workload, and so on. Here, the workload is associated with twenty computing resources. Information for some of the computing resources may be accessed by scrolling down in the user interface 1200. In some examples, the user interface 1200 may be presented instead of, or in addition to, the user interface 400 of FIG. 4. However, the user interface 1200 may be presented in various contexts.

Figure 13:
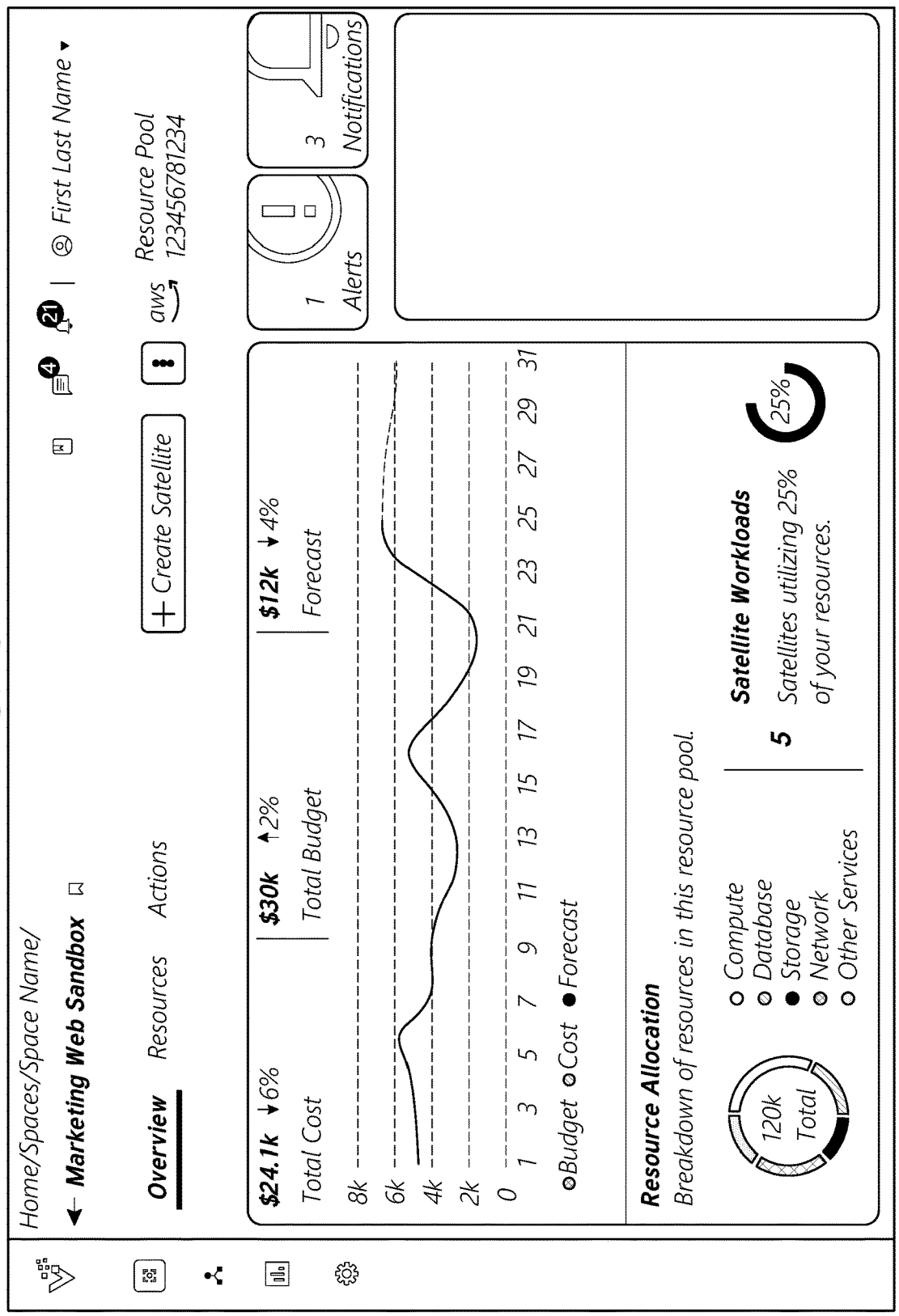
FIG. 13 illustrates a further example user interface to provide information about a workload in accordance with one or more embodiments.

FIG. 13 illustrates a further example user interface 1300 to provide information about a workload. In this example, the user interface 1300 may provide information regarding a workload entitled "Marketing Web Sandbox." As shown, the user interface 1300 displays information in an overview tab, which may include information about cost associated with the workload (e.g., a graph/value indicating a budget/cost/forecasted cost for implementing computing resources associated with the workload, which may be over a time period), information about resource allocation (e.g., a pie chart indicating a breakdown of computing resource types), information about satellite workloads (e.g., an indicator to create a satellite workload, an indicator/visualization for a number of satellites being implemented, etc.), an indicator for an alert, an indicator for a notification, and so on. In some examples, the user interface 1300 may be presented instead of, or in addition to, the user interface 400 of FIG. 4. However, the user interface 1300 may be presented in various contexts.

Figures 1, 14:
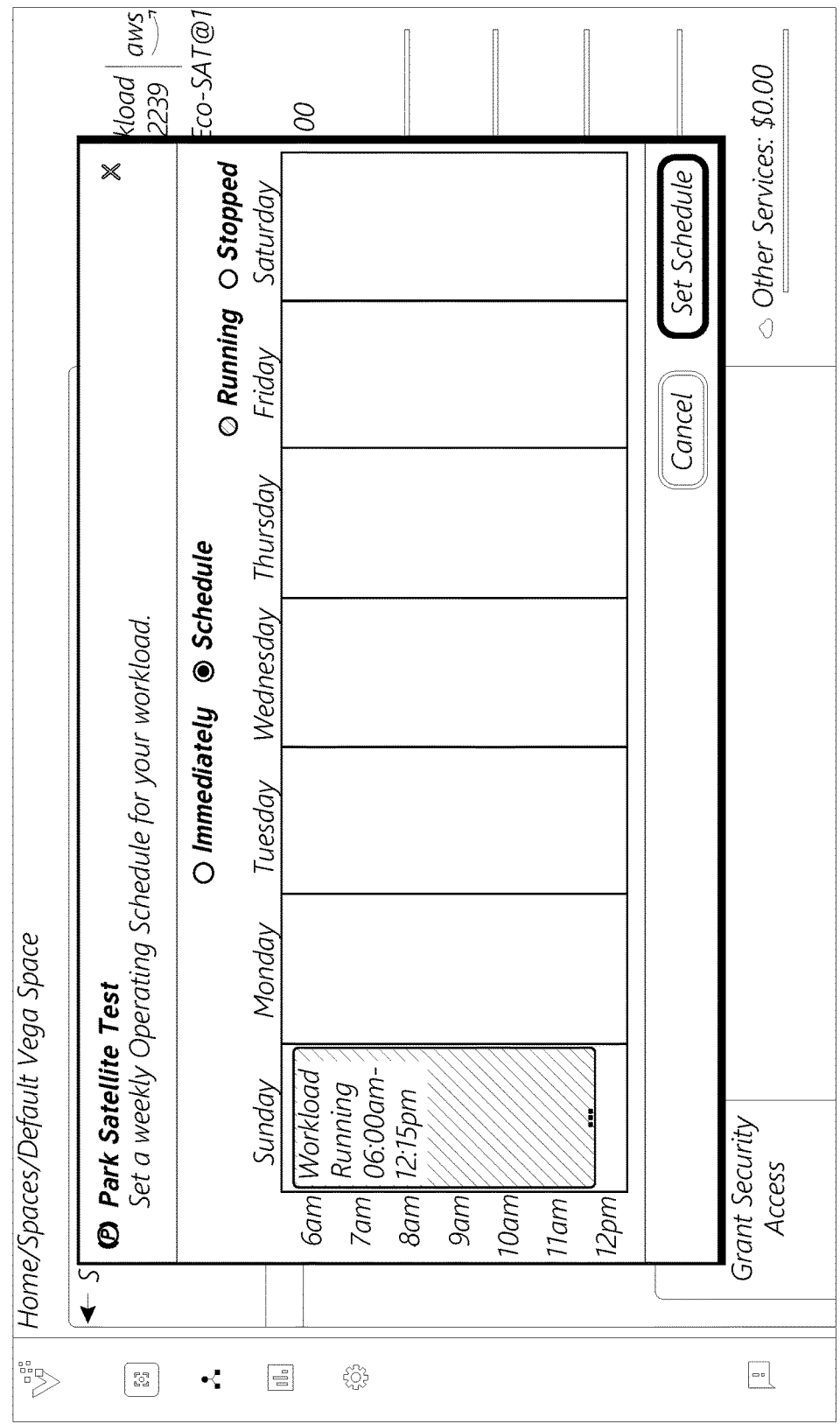
Figures 2, 14:
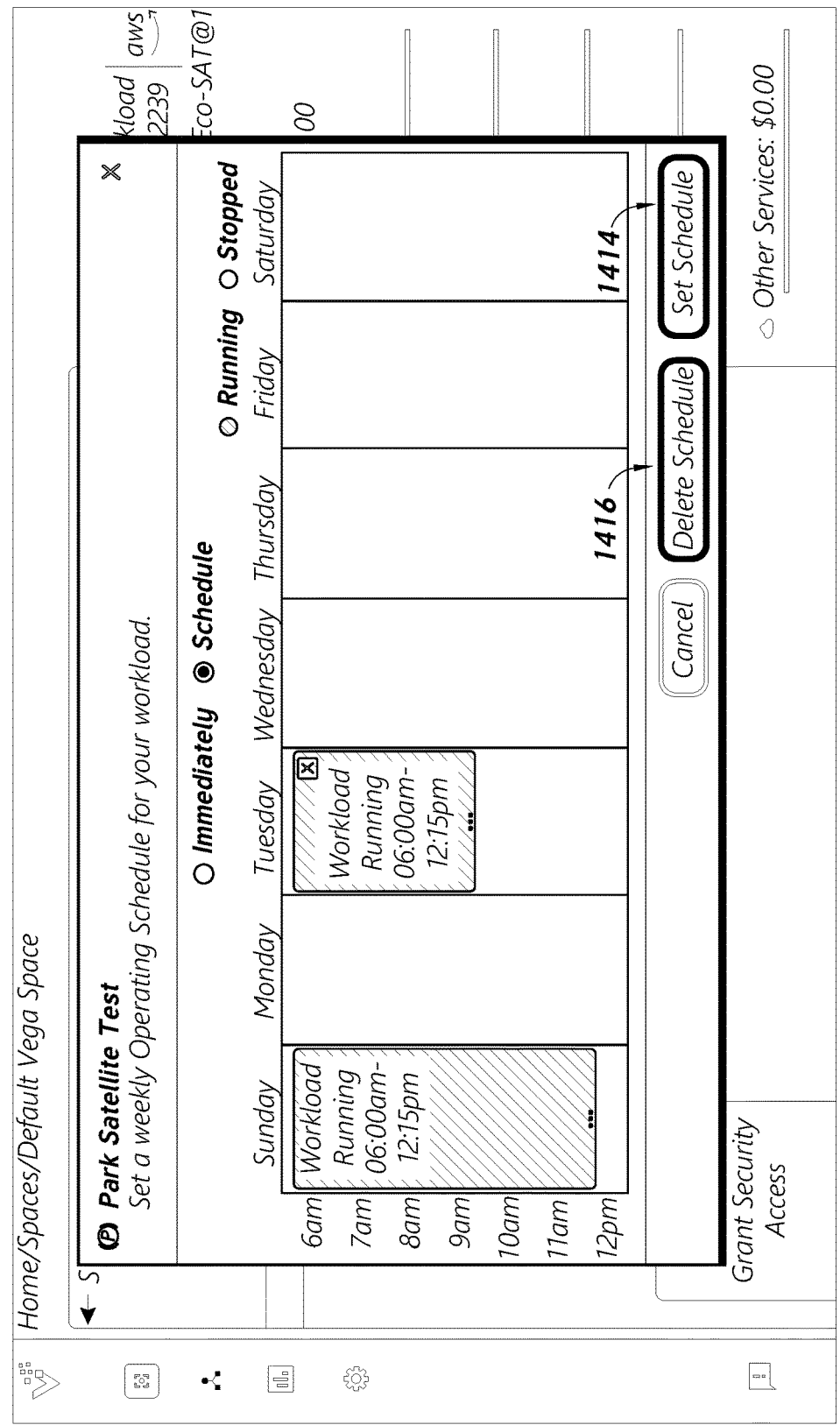
Figures 3, 14:
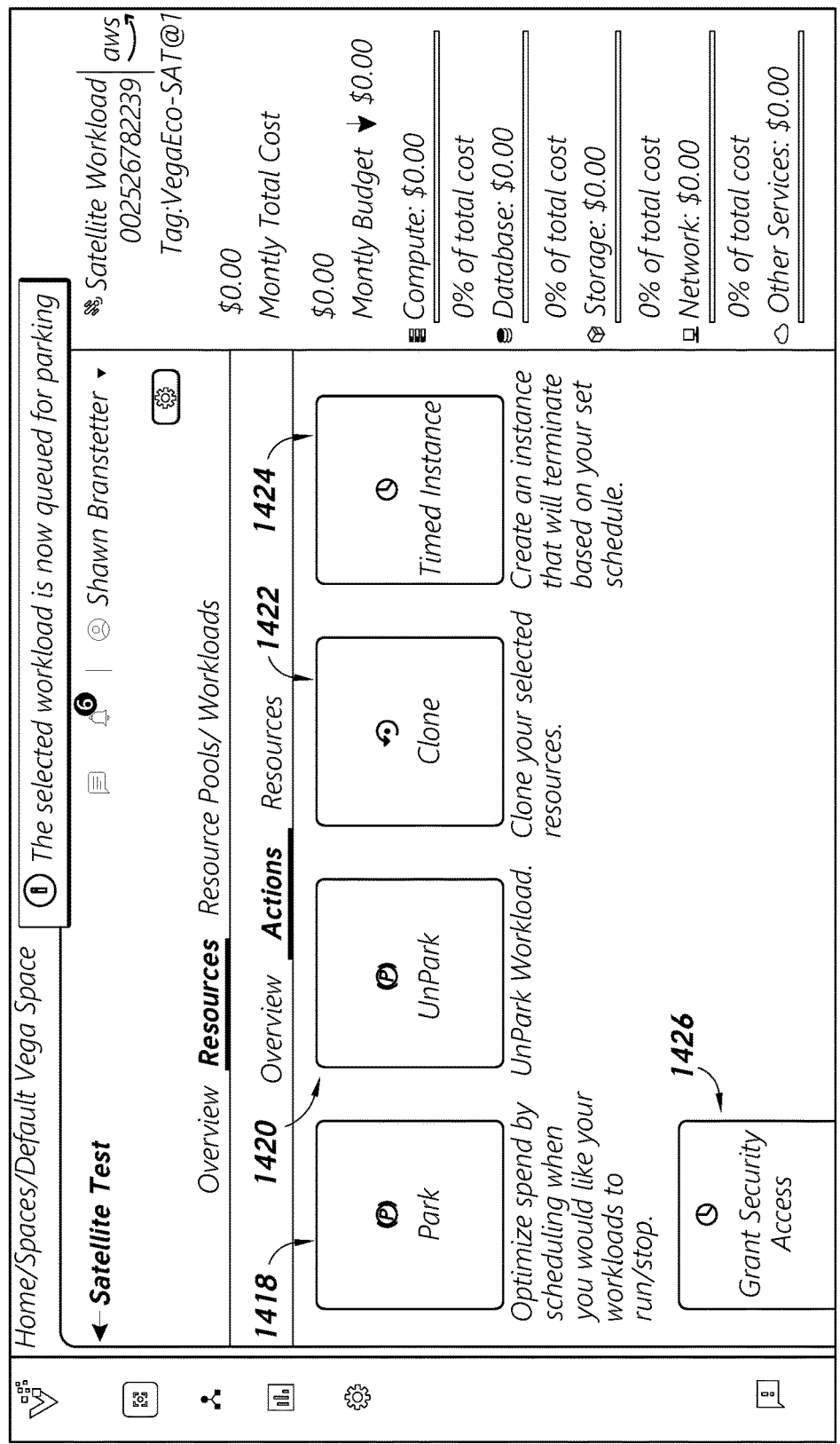
Figures 4, 14:
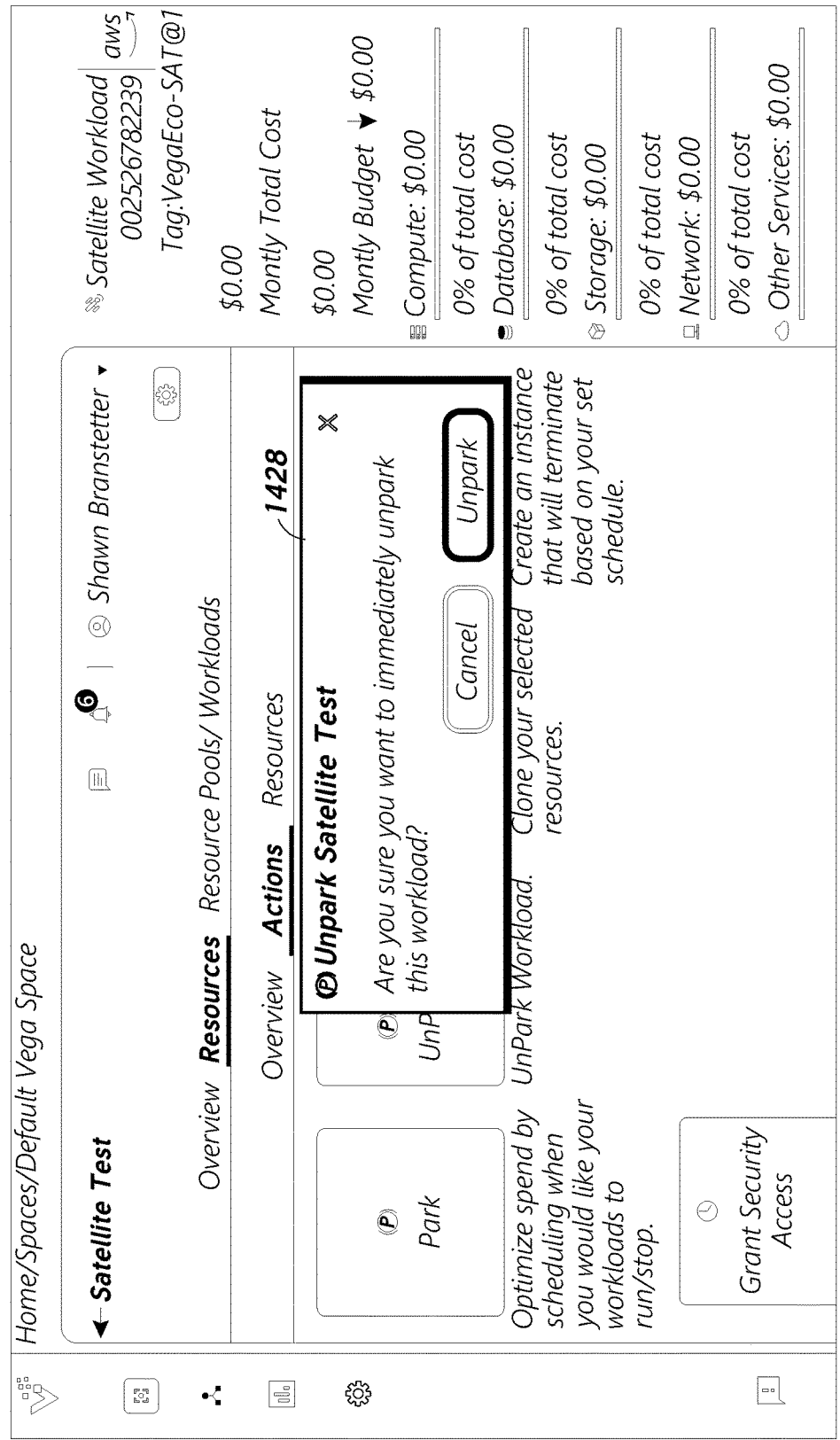
Figures 5, 14:
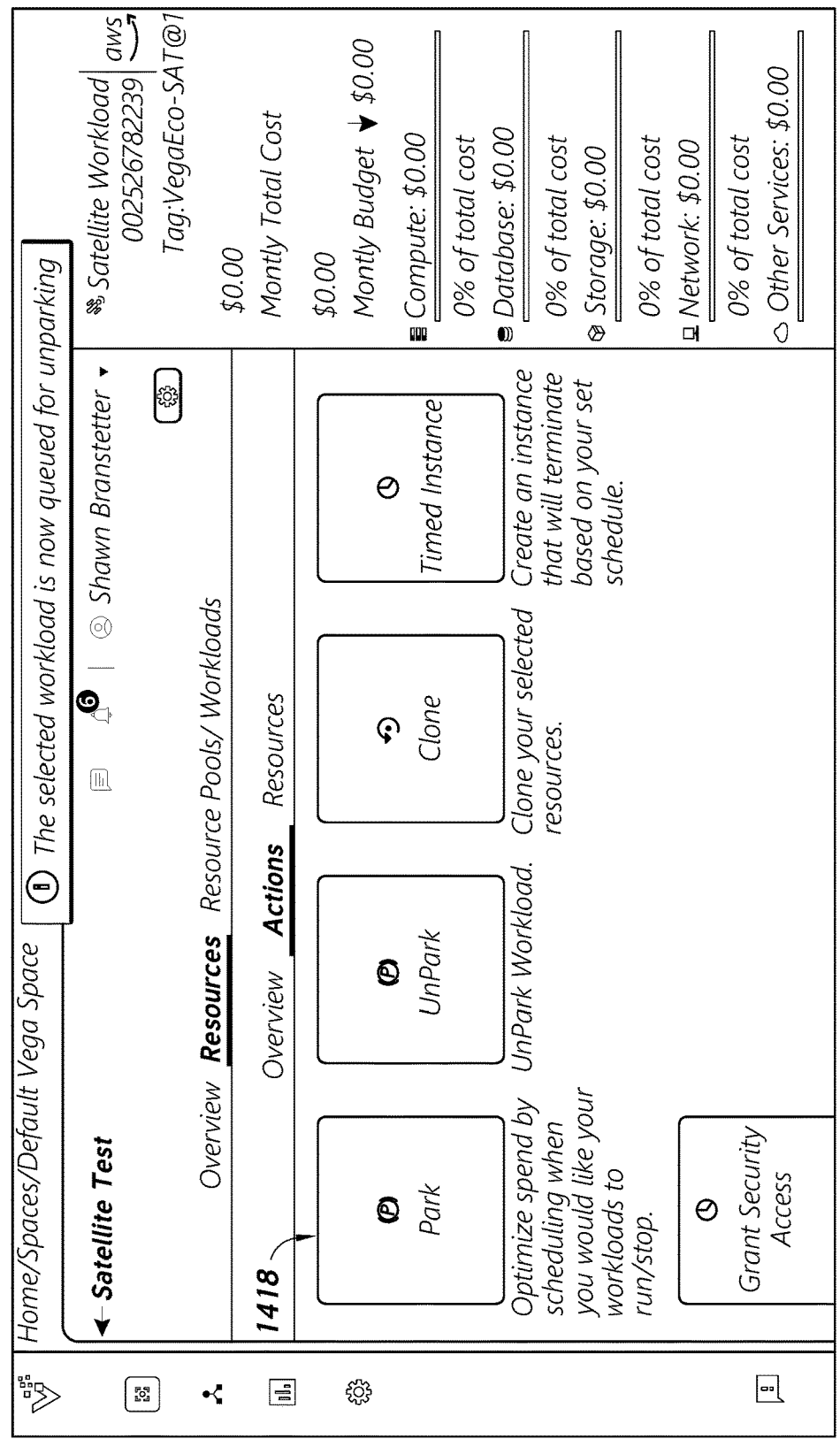
Figures 6, 14:
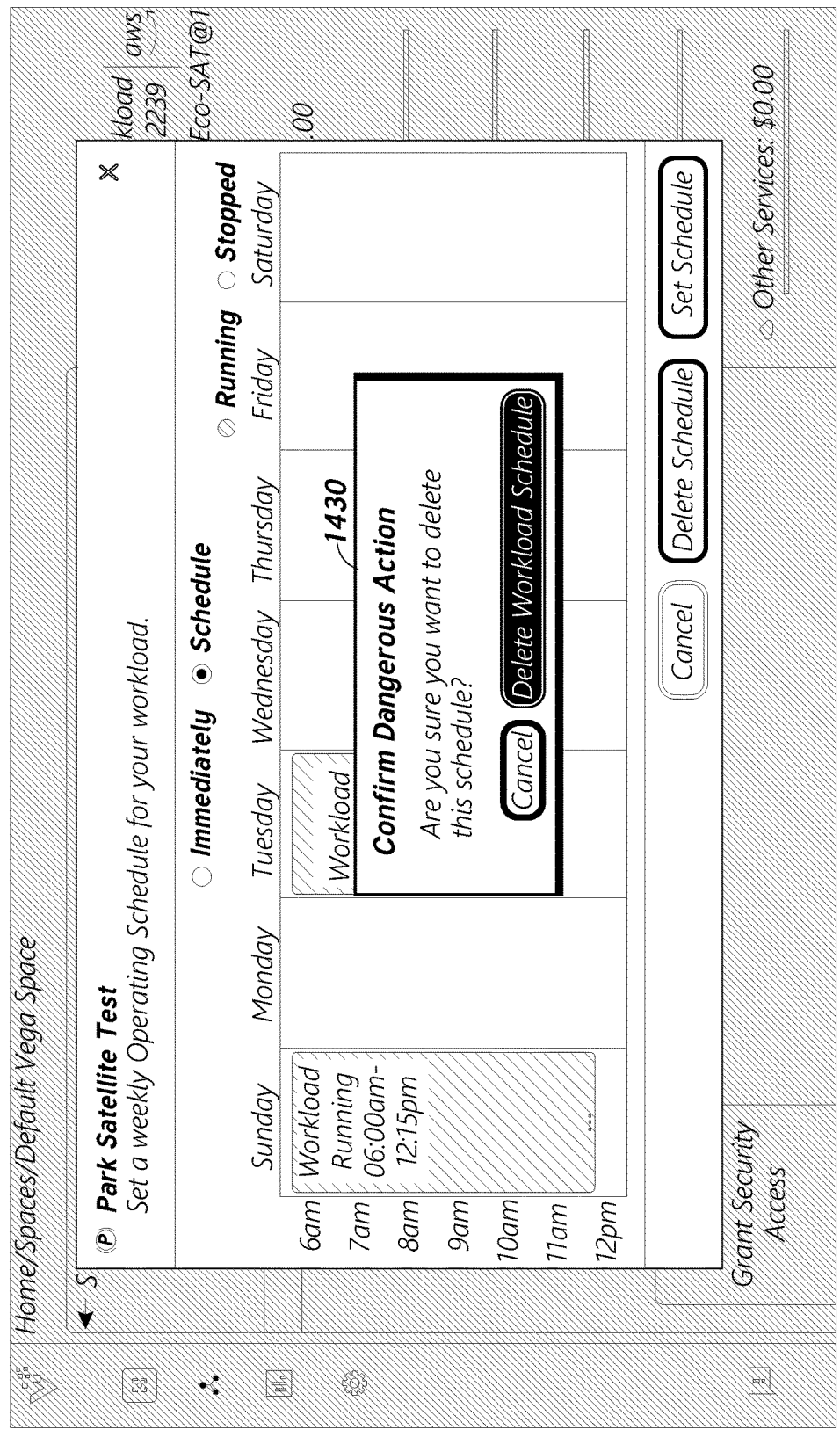
Figures 7, 14:
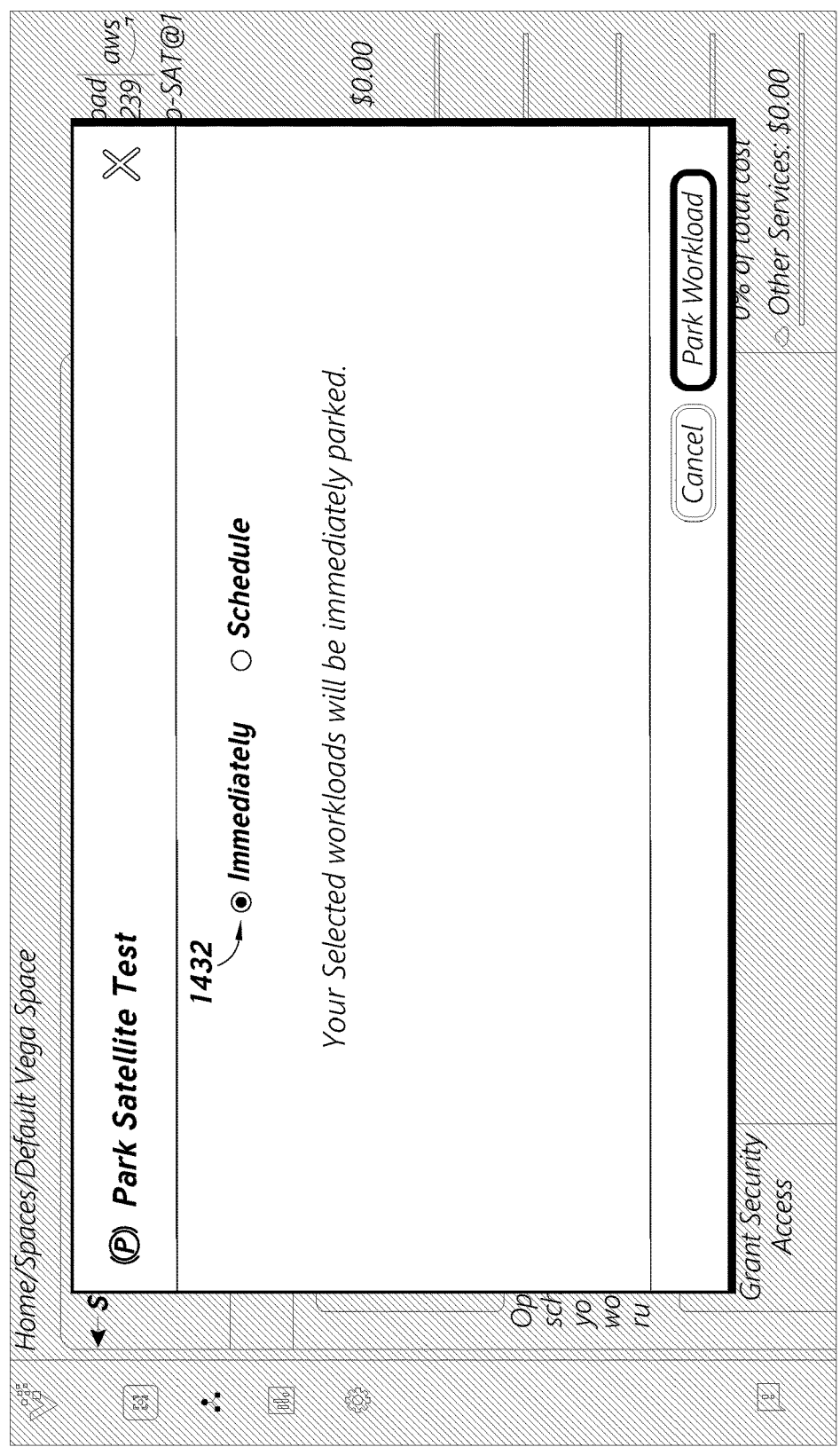

FIGS. 14-1 through 14-7 illustrate example user interfaces 1400-1412 to facilitate various functionality associated with setting/updating a park schedule for a space/workload in accordance with one or more embodiments. In some embodiments, any of the user interfaces 1400-1412 may be provided in the context of various parking-related interfaces, such as when providing one or more of the interfaces discussed for FIGS. 7-1 through 7-3, and so on. However, any of the user interfaces 1400-1412 may be presented in any context. In these examples, the user interfaces 1400-1412 are generally discussed in the context of performing parking-related actions for a space. However, such interfaces may additionally, or alternatively be provided to perform parking-related actions for a workload.

As shown in FIG. 14-1, the user interface 1400 can present a calendar representation for any number of days/hours/weeks (e.g., a calendar) to enable a user to view/designate/update a parking schedule for a space/workload (i.e., the "Satellite Test" space/workload). For example, the user interface 1400 may provide information indicating the existing park schedule for the space (e.g., the running/parking schedule for Sunday). Further, in this example, the user may select an additional day(s)/hour(s) for running and/or parking the space. For example, as shown in FIG. 14-2, the user may update the schedule for Tuesday such that the workloads associated with the space run during particular hours of the day and are set to a parked state (e.g., inactive state) outside of those hours. The user may select a set button 1414 to set/update the parking schedule for the space. In examples, the user may additionally, alternatively, select a running time block (e.g., the Sunday or Tuesday block shown) and delete/update the schedule, such as by selecting a delete button 1416, adjusting a length of time for the block, and so on. In examples, the user interface 1404 of FIG. 14-3 may be presented upon setting/updating the parking schedule for the space to inform the user that the parking schedule is queued for parking. Although a schedule is implemented in this example, the user may alternatively cause the space to be parked immediately, as discussed below.

As shown, FIG. 14-3 also illustrates a park button 1418 to cause a parking action to be performed, an unpark button 1420 to cause an unparking action to be performed, a clone button 1422 to cause a clone action to be performed, a time instance button 1424 to create an instance of the space for a period of time (e.g., will terminate after a particular period of time, at a certain time, etc.), and a grant security access button 1426 to grant security access to the space. Other buttons may also be implemented to enable a user to initiate other types of actions.

FIG. 14-4 illustrates the example user interface 1406 to unpark a space. For example, in response to selecting the unpark button 1420 in the user interface 1404, the user interface 1406 may be presented, which provides a window 1428 to confirm that the user would like to unpark the space. Upon confirming that the user would like to unpark the space, the workloads associated with the space may to switch back to an active state in which one or more associated computing resources are implemented. In some examples, the example user interface 1408 (shown in FIG. 14-5) may be provided in response to confirming that the user would like to unpark the space. The user interface 1408 may inform the user that the workload is queued for unparking.

FIG. 14-6 illustrates the example user interface 1410 to delete a schedule for the space. For example, in response to selecting the delete button 1416 in the user interface 1402 of FIG. 14-2, the user interface 1410 may be presented to delete the parking/running schedule for the space. As illustrated, the user interface 1402 may presented a window 1430 to confirm that the user would like to delete the parking/running schedule. Upon confirming deletion of the parking/running schedule, the parking/running schedule may be deleted, cause the workloads associated with the space to remain in an active state (e.g., run all the time).

FIG. 14-7 illustrates the example user interface 1412 to park the space immediately. For example, in response to selecting an immediately button 1432, which may also be selected via the user interface 1400/1402, a window 1434 may be presented/updated to confirm that the user would like to park the space at the current time and/or for an undetermined amount of time. Upon confirming that the user would like to park the space, the workloads associated with the space may be set to an inactive state, which is not generally based on a schedule.

Any of the user interfaces discussed herein may be displayed via a client device, a device associated with the management service 102, a device associated with a service provider, and so on. Further, any of the user interfaces may be presented via an online portal (e.g., website), an application (e.g., mobile application, desktop application, etc.), etc. Moreover, information in any of the user interface may be combined and/or omitted.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

EXAMPLE CLAUSES

Example A, a system comprising: one or more processors; and memory communicatively coupled to the one or more processors and including computer-executable instructions stored thereupon which, when executed by the one or more processors, cause the one or more processors to perform operations comprising: providing a first user interface to manage cloud computing resources; receiving, via the first user interface, first user input data requesting to organize a first workload in a space, the first workload being associated with a first cloud computing service of a first entity; based at least in part on the first user input data, importing first data associated with the first workload into the space; receiving, via the first user interface, second user input data requesting to organize a second workload in the space, the second workload being associated with a second cloud computing service of a second entity; based at least in part on the second user input data, importing second data associated with the second workload into the space; receiving, via the first user interface or a second user interface, third user input data requesting to perform an action for the space; and based at least in part on the third user input data: determining a first workflow for the first workload; causing the first workflow to be performed to implement the action for the first workload; and determining a second workflow for the second workload; causing the second workflow to be performed to implement the action for the second workload, the second workflow being different than the first workflow.

Example B, the system of Example A, wherein: causing the first workflow to be performed comprises at least transmitting a first request to the first cloud computing service to alter a characteristic of a first computing resource associated with the first workload; and causing the second workflow to be performed comprises at least transmitting a second request to the second cloud computing service to alter a characteristic of a second computing resource associated with the second workload.

Example C, the system of Example A or B, wherein: the action comprises a parking action of setting a computing resource to an inactive state; the causing the first workflow to be performed comprises causing a first computing resource of the first cloud computing service to be set to the inactive state during a first period of time; and the causing the first workflow to be performed comprises causing a second computing resource of the second cloud computing service to be set to the inactive state during a second period of time.

Example D, the system of Example C, wherein the operations further comprise: receiving first data indicating a utilization of a first computing resource of the first cloud computing service; receiving second data indicating a utilization of a second computing resource of the second cloud computing service; determining that the first computing resource is underutilized based at least in part on the first data; determining that the second computing resource is underutilized based at least in part on the second data; and providing a recommendation to perform the action.

Example E, the system of Example D, wherein the operations further comprise: generating a visualization that represents the underutilization of the first computing resource and the underutilization of the second computing resource.

Example F, the system of any of Examples A-E, wherein: the first user input data includes a request to create a new workload; and the importing the first data associated with the first workload comprises: based at least in part on the first user input data, provisioning a computing resource to implement the first workload; and associating the first data with the space.

Example G, the system of any of Examples A-F, wherein: the first user input data includes a request to import an existing workload; and the importing the first data associated with the first workload comprises: based at least in part on the first user input data, transmitting a request to the first cloud computing service to receive the first data associated with the first workload; and receiving, from the first cloud computing service, the first data associated with the first workload.

Example H, a method comprising: presenting a service provider management interface to facilitate management of multiple service provider resources; receiving, by one or more processors and via the service provider management interface, a first request to group a first workload and a second workload, the first workload being implemented by a first service provider of a first entity and the second workload being implemented by a second service provider of a second entity; based at least in part on the first request, creating, by the one or more processors, a group that includes the first workload and the second workload; receiving, by the one or more processors, a second request to perform an action for the group; and based at least in part on second request: causing the action to be performed for the first workload by communicating with the first service provider; and causing the action to be performed for the second workload by communicating with the second service provider.

Example I, the method of Example H, wherein: the causing the action to be performed for the first workload comprises implementing a first workflow that includes one or more first tasks; and the causing the action to be performed for the second workload comprises implementing a second workflow that includes one or more second tasks.

Example J, the method of Example H or I, wherein: the action comprises setting a computing resource to an inactive state; the causing the action to be performed for the first workload comprises causing a first computing resource of the first service provider to be set to the inactive state; and the causing the action to be performed for the second workload comprises causing a second computing resource of the second service provider to be set to the inactive state.

Example K, the method of Example J, further comprising: determining a period of time to set the first workload and the second workload to the inactive state; wherein the causing the action to be performed for the first workload comprises causing the first computing resource of the first service provider to be set to the inactive state during the period of time; and wherein the causing the action to be performed for the first workload comprises causing the first computing resource of the first service provider to be set to the inactive state during the period of time.

Example L, the method of Example K, wherein the determining the period of time is based at least in part on utilization data for the first workload and utilization data for the second workload.

Example M, the method of Example K, wherein the determining the period of time comprises receiving user input data indicating the period of time for inactivity.

Example N, the method of any of Examples A-K, further comprising: associating the group with a budget; determining an amount spent on computing resources for implementing the first workload and the second workload; and causing display of an indicating regarding the budget and the amount spent on the computing resources.

Example O, one or more non-transitory computer-readable media storing computer-executable instructions that, when executed, instruct one or more processors to perform operations comprising: presenting a service provider management interface to facilitate management of multiple service provider resources; receiving, via the service provider management interface, a first request to group a first workload and a second workload, the first workload being implemented by a first service provider of a first entity and the second workload being implemented by a second service provider of a second entity; based at least in part on the first request, grouping the first workload and the second workload; receiving a second request to perform an action for the group; and based at least in part on second request: causing the action to be performed for the first workload by communicating with the first service provider; and causing the action to be performed for the second workload by communicating with the second service provider.

Example P, the one or more non-transitory computer-readable media of Example O, wherein: the causing the action to be performed for the first workload comprises implementing a first workflow that includes one or more first tasks; and the causing the action to be performed for the second workload comprises implementing a second workflow that includes one or more second tasks.

Example Q, the one or more non-transitory computer-readable media of Example O or P, wherein: the action comprises setting a computing resource to an inactive state; the causing the action to be performed for the first workload comprises causing a first computing resource of the first service provider to be set to the inactive state; and the causing the action to be performed for the second workload comprises causing a second computing resource of the second service provider to be set to the inactive state.

Example R, the one or more non-transitory computer-readable media of any of Examples O-Q, wherein the operations further comprise: determining a period of time for inactivity of the first workload and the second workload; wherein the causing the action to be performed for the first workload comprises causing the first computing resource of the first service provider to be set to the inactive state during the period of time; and wherein the causing the action to be performed for the first workload comprises causing the first computing resource of the first service provider to be set to the inactive state during the period of time.

Example S, the one or more non-transitory computer-readable media of Example R, wherein the determining the period of time for inactivity is based at least in part on utilization data for the first workload and utilization data for the second workload.

Example T, the one or more non-transitory computer-readable media of Example R, wherein the determining the period of time for inactivity comprises receiving user input data indicating the period of time for inactivity.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

It should be appreciated that in the above description of embodiments, various features are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the disclosure should not be limited by the particular embodiments described above.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same, related, or unrelated reference numbers. The relevant features, elements, functions, operations, modules, etc. may be the same or similar functions or may be unrelated.

What is claimed is:

1. A system comprising:
one or more processors; and
memory communicatively coupled to the one or more processors and including computer-executable instructions stored thereupon which, when executed by the one or more processors, cause the one or more processors to perform operations comprising:
providing a first user interface to manage cloud computing resources;
receiving, via the first user interface, first user input data requesting to organize a first workload in a space, the first workload being associated with a first group of cloud resources of a first service provider;
based at least in part on the first user input data, importing first data associated with the first workload into the space, the first data indicating at least a first operation cost for the first workload;
receiving, via the first user interface, second user input data requesting to organize a second workload in the space, the second workload being associated with a second group of cloud resources of a second service provider;
based at least in part on the second user input data, importing second data associated with the second workload into the space, the second data indicating at least a second operation cost for the second workload;

providing, via the first user interface or a second user interface, information that is based at least in part on the first data and the second data;

receiving, via the first user interface or the second user interface, third user input data requesting to perform an action for the space; and based at least in part on the third user input data, causing the action to be performed for the first workload and the second workload by:

determining a first workflow for the first workload based at least in part on a characteristic of the first workload, the first workflow including a first set of tasks to be performed in a first order;

causing the first workflow to be performed to implement the action for the first workload;

determining a second workflow for the second workload based at least in part on a characteristic of the second workload, the second workflow including a second set of tasks to be performed in a second order; and causing the second workflow to be performed to implement the action for the second workload, the second workflow being different than the first workflow.

2. The system of claim 1, wherein:

causing the first workflow to be performed comprises at least transmitting a first request to the first service provider to alter a characteristic of a first computing resource associated with the first workload; and causing the second workflow to be performed comprises at least transmitting a second request to the second service provider to alter a characteristic of a second computing resource associated with the second workload.

3. The system of claim 1, wherein:

the action comprises a parking action of setting a computing resource to an inactive state;

the causing the first workflow to be performed comprises causing a cloud resource of the first group of cloud resources to be set to the inactive state during a first period of time; and the causing the second workflow to be performed comprises causing a cloud resource of the second group of cloud resources to be set to the inactive state during a second period of time.

4. The system of claim 3, wherein the operations further comprise:

receiving first utilization data indicating a utilization of a first cloud resource of the first group of cloud resources;

receiving second utilization data indicating a utilization of a second cloud resource of the second group of cloud resources;

determining that the first cloud resource is underutilized based at least in part on the first utilization data;

determining that the second cloud resource is underutilized based at least in part on the second utilization data; and providing a recommendation to perform the action.

5. The system of claim 4, wherein the operations further comprise:

generating a visualization that represents the underutilization of the first cloud resource and the underutilization of the second cloud resource.

6. The system of claim 1, wherein:

the first user input data includes a request to create a new workload; and the importing the first data associated with the first workload comprises:

based at least in part on the first user input data, provisioning a computing resource to implement the first workload; and associating the first data with the space.

7. The system of claim 1, wherein:

the first user input data includes a request to import an existing workload; and the importing the first data associated with the first workload comprises:

based at least in part on the first user input data, transmitting a request to the first service provider to receive the first data associated with the first workload; and receiving, from the first service provider, the first data associated with the first workload.

8. A method comprising:

presenting a service provider management interface to facilitate management of multiple service provider resources;

receiving, by one or more processors and via the service provider management interface, a first request to group a first workload and a second workload, the first workload being implemented by a first service provider associated with a first user account and the second workload being implemented by a second service provider associated with a second user account;

based at least in part on the first request, creating, by the one or more processors, a group that includes the first workload and the second workload;

associating first data and second data with the group, the first data indicating at least a first operation cost for the first workload, the second data indicating at least a second operation cost for the second workload;

providing, via the service provider management interface, information that is based at least in part on the first data and the second data;

receiving, by the one or more processors, a second request to perform an action for the group; and based at least in part on the second request:

causing the action to be performed for the first workload by performing a first set of tasks in a first order, the first set of tasks being based at least in part on a characteristic of the first workload; and causing the action to be performed for the second workload by performing a second set of tasks in a second order, the second set of tasks being based at least in part on a characteristic of the second workload.

9. The method of claim 8, wherein:

the action comprises setting a computing resource to an inactive state;

the causing the action to be performed for the first workload comprises causing a first computing resource of the first service provider to be set to the inactive state; and the causing the action to be performed for the second workload comprises causing a second computing resource of the second service provider to be set to the inactive state.

10. The method of claim 9, further comprising:

determining a period of time to set the first workload and the second workload to the inactive state;

wherein the causing the action to be performed for the first workload comprises causing the first computing resource of the first service provider to be set to the inactive state during the period of time; and wherein the causing the action to be performed for the second workload comprises causing the second computing resource of the second service provider to be set to the inactive state during the period of time.

11. The method of claim 10, wherein the determining the period of time is based at least in part on utilization data for the first workload and utilization data for the second workload.

12. The method of claim 10, wherein the determining the period of time comprises receiving user input data indicating the period of time.

13. The method of claim 8, further comprising:
associating the group with a budget;
determining an amount spent on computing resources for implementing the first workload and the second workload; and
causing display of an indication regarding the budget and the amount spent on the computing resources.

14. One or more non-transitory computer-readable media storing computer-executable instructions that, when executed, instruct one or more processors to perform operations comprising:
presenting a service provider management interface to facilitate management of multiple service provider resources;
receiving, via the service provider management interface, a first request to group a first workload and a second workload, the first workload being implemented by a first service provider of a first entity and the second workload being implemented by a second service provider of a second entity;
based at least in part on the first request, grouping the first workload and the second workload into a group;
associating first data and second data with the group, the first data indicating at least a first operation cost for the first workload, the second data indicating at least a second operation cost for the second workload;
providing, via the service provider management interface, information that is based at least in part on the first data and the second data;
receiving a second request to perform an action for the group; and
based at least in part on second request:
causing the action to be performed for the first workload by performing a first workflow that includes a first set of tasks in a first order, the first workflow being based at least in part on a characteristic of the first workload; and
causing the action to be performed for the second workload by performing a second workflow that includes a second set of tasks in a second order, the second workflow being based at least in part on a characteristic of the second workload.

15. The one or more non-transitory computer-readable media of claim 14, wherein:
the action comprises setting a computing resource to an inactive state;
the causing the action to be performed for the first workload comprises causing a first computing resource of the first service provider to be set to the inactive state; and
the causing the action to be performed for the second workload comprises causing a second computing resource of the second service provider to be set to the inactive state.

16. The one or more non-transitory computer-readable media of claim 15, wherein the operations further comprise:
determining a period of time for inactivity of the first workload and the second workload;
wherein the causing the action to be performed for the first workload comprises causing the first computing resource of the first service provider to be set to the inactive state during the period of time; and
wherein the causing the action to be performed for the second workload comprises causing the second computing resource of the second service provider to be set to the inactive state during the period of time.

17. The one or more non-transitory computer-readable media of claim 16, wherein the determining the period of time for inactivity is based at least in part on utilization data for the first workload and utilization data for the second workload.

18. The one or more non-transitory computer-readable media of claim 16, wherein the determining the period of time for inactivity comprises receiving user input data indicating the period of time for inactivity.

* * * * *